United States Patent
Sakaguchi et al.

(10) Patent No.: US 11,895,937 B2
(45) Date of Patent: Feb. 13, 2024

(54) SLIP DETERMINATION SYSTEM, TRAVEL PATH GENERATION SYSTEM, AND FIELD WORK VEHICLE

(71) Applicant: Kubota Corporation, Osaka (JP)

(72) Inventors: Kazuo Sakaguchi, Amagasaki (JP); Tomohiko Sano, Amagasaki (JP); Osamu Yoshida, Amagasaki (JP); Tetsuya Nakajima, Sakai (JP); Takashi Nakabayashi, Sakai (JP); Satoshi Maruo, Amagasaki (JP); Kazuhiro Takahara, Sakai (JP)

(73) Assignee: Kubota Corporation, Osaka (JP)

( * ) Notice: Subject to any disclaimer, the term of this patent is extended or adjusted under 35 U.S.C. 154(b) by 758 days.

(21) Appl. No.: 16/766,463

(22) PCT Filed: Dec. 10, 2018

(86) PCT No.: PCT/JP2018/045355
§ 371 (c)(1),
(2) Date: May 22, 2020

(87) PCT Pub. No.: WO2019/117094
PCT Pub. Date: Jun. 20, 2019

(65) Prior Publication Data
US 2020/0375084 A1    Dec. 3, 2020

(30) Foreign Application Priority Data

Dec. 15, 2017  (JP) ................................ 2017-240638
Dec. 15, 2017  (JP) ................................ 2017-240639

(51) Int. Cl.
*A01B 76/00*       (2006.01)
*A01B 69/04*       (2006.01)
(Continued)

(52) U.S. Cl.
CPC ............ *A01B 69/008* (2013.01); *A01B 76/00* (2013.01); *A01D 75/00* (2013.01); *B60W 30/045* (2013.01);
(Continued)

(58) Field of Classification Search
CPC ..... A01B 69/008; A01B 69/00; A01B 79/005; A01B 63/112; A01B 63/1145;
(Continued)

(56) References Cited

U.S. PATENT DOCUMENTS

| | | | |
|---|---|---|---|
| 5,438,817 A | 8/1995 | Nakamura |
| 5,606,850 A | 3/1997 | Nakamura |

(Continued)

FOREIGN PATENT DOCUMENTS

| | | | |
|---|---|---|---|
| EP | 2946651 A1 | 11/2015 |
| EP | 3146823 A1 | 3/2017 |

(Continued)

*Primary Examiner* — Truc M Do
(74) *Attorney, Agent, or Firm* — The Webb Law Firm

(57) ABSTRACT

A slip determination system is provided that is capable of providing appropriate control information to a traveling vehicle when the traveling vehicle has proceeded to an area where a slip is likely to occur during automatic travel. The slip determination system includes: a vehicle position detection module for detecting a vehicle position; and an automatic travel control portion for enabling automatic travel based on the vehicle position and a set travel path; a slip amount calculation portion for calculating a slip amount of the traveling vehicle body, using an estimated movement distance of the traveling vehicle body calculated based on the number of revolutions of a driving axle of the traveling vehicle body, and an actual movement distance of the traveling vehicle body calculated based on the vehicle position; an appropriateness determination portion for performing appropriateness determination to determine, based on the slip amount, whether or not a state of a traveling (Continued)

ground surface is appropriate for automatic travel; and an automatic travel stop portion for stopping automatic travel based on a determination result.

9 Claims, 12 Drawing Sheets

(51) Int. Cl.
    *A01D 75/00* (2006.01)
    *B60W 30/045* (2012.01)
    *B60W 40/064* (2012.01)
    *G05D 1/02* (2020.01)

(52) U.S. Cl.
    CPC ......... B60W 40/064 (2013.01); G05D 1/0214 (2013.01); *B60W 2552/00* (2020.02); *B60W 2720/12* (2013.01)

(58) Field of Classification Search
    CPC ..... A01B 76/00; A01D 75/00; B60W 30/045; B60W 40/064; B60W 2552/00; B60W 2720/12; G05D 1/0214
    See application file for complete search history.

(56) References Cited

U.S. PATENT DOCUMENTS

| | | | |
|---|---|---|---|
| 6,285,944 B1 | 9/2001 | Tange et al. | |
| 2003/0171186 A1* | 9/2003 | Okada | B60W 10/04 477/71 |
| 2006/0178820 A1* | 8/2006 | Eglington | A01B 69/008 701/50 |
| 2009/0069993 A1 | 3/2009 | Inoue et al. | |
| 2010/0017075 A1* | 1/2010 | Beaujot | A01B 69/008 701/50 |
| 2010/0312428 A1* | 12/2010 | Roberge | A01B 69/007 717/106 |
| 2011/0112730 A1 | 5/2011 | Rekow | |
| 2012/0239260 A1* | 9/2012 | Ishikawa | A01B 63/1145 701/50 |
| 2014/0222304 A1* | 8/2014 | Dix | B60W 10/111 701/60 |
| 2015/0351320 A1 | 12/2015 | Takahara et al. | |
| 2016/0174453 A1 | 6/2016 | Matsuzaki et al. | |
| 2016/0340867 A1 | 11/2016 | Matsuzaki | |
| 2017/0079195 A1* | 3/2017 | Yokoyama | A01B 69/00 |
| 2017/0268202 A1 | 9/2017 | Matsuzaki | |
| 2018/0084711 A1* | 3/2018 | Gresch | A01C 7/102 |
| 2018/0136664 A1 | 5/2018 | Tomita et al. | |
| 2019/0050947 A1 | 2/2019 | Araki et al. | |

FOREIGN PATENT DOCUMENTS

| | | |
|---|---|---|
| EP | 3146823 B1 | 3/2019 |
| JP | 6113607 A | 4/1994 |
| JP | 20006787 A | 1/2000 |
| JP | 200289314 A | 3/2002 |
| JP | 20048053 A | 1/2004 |
| JP | 2006213189 A | 8/2006 |
| JP | 2007237933 A | 9/2007 |
| JP | 200894124 A | 4/2008 |
| JP | 2008237172 A | 10/2008 |
| JP | 200961945 A | 3/2009 |
| JP | 2012191857 A | 10/2012 |
| JP | 2014187954 A | 10/2014 |
| JP | 2015112070 A | 6/2015 |
| JP | 201631649 A | 3/2016 |
| JP | 2016168883 A | 9/2016 |
| JP | 201755673 A | 3/2017 |
| JP | 201768533 A | 4/2017 |
| JP | 2017211734 A | 11/2017 |

* cited by examiner

SLIP DETERMINATION SYSTEM, TRAVEL PATH GENERATION SYSTEM, AND FIELD WORK VEHICLE

CROSS-REFERENCE TO RELATED APPLICATIONS

This application is the United States national phase of International Application No. PCT/JP2018/045355 filed Dec. 10, 2018, and claims priority to Japanese Patent Application Nos. 2017-240638 and 2017-240639, filed Dec. 15, 2017, the disclosures of which are hereby incorporated by reference in their entirety.

TECHNICAL FIELD

The present invention relates to a slip determination system, a travel path generation system, and a field work vehicle.

BACKGROUND ART (1) Conventionally, there are slip determination systems that calculate a slip amount of a traveling vehicle and use the calculated slip amount to control the traveling vehicle. These systems are particularly suitable for work vehicles that automatically travel along a travel path in a field and perform agricultural work.

A combine harvester disclosed in Patent Document 1 calculates a travel path for automatic travel based on an outer-shape map, which is obtained by manually traveling for circulating work around an outer periphery of a field, and travels for automatic work such that the vehicle position detected by a vehicle-position detection module moves along the travel path.

A field work machine disclosed in Patent Document 2 calculates a slip rate of a wheel based on a travel distance calculated using a rotational speed of the vehicle and a travel distance calculated using position information obtained by a GPS, and adjusts an operation timing of work equipment, such as a seedling planting apparatus or a fertilizer applicator, based on the calculated slip rate.

Furthermore, a tractor disclosed in Patent Document 3 corrects a draft control amount at a slip rate calculated using a GPS, in draft control for lifting up and down a ground work apparatus, such as a plow, based on the result of detecting a traction load sensor.

(2) Conventionally, there are travel path generation systems that generate a travel path for performing automatic travel in a field in work is performed by which different types of field work vehicles, and field work vehicles that employ such a travel path generation system.

In agricultural work in a field, various field work vehicles, such as a tractor equipped with a cultivating apparatus, a tractor equipped with a ploughing apparatus, a rice transplanter, a seeding machine, a fertilizer applicator, and a harvester (combine harvester), are used in accordance with seasons in agricultural work. The results of agricultural work performed by these field work vehicles should be information useful for subsequent field work vehicles that are to perform agricultural work later. However, thus far, individual ability of agricultural workers has been relied on to use such information, and the results of work performed by the preceding field work vehicles are hardly used by the subsequent field work vehicles using information technologies.

In a work information sharing system in Patent Document 4, a combine harvester, a tractor, and a rice transplanter are provided with a GPS communicating portion and a control device, and a shared recording device is prepared. The recording device is attached to the tractor during ploughing work, attached to the rice transplanter during planting work, and is attached to the combine harvester during harvest work. The traveling speed of the combine harvester during harvest work and information from the GPS communicating portion are recorded in the recording device, and the amount of fertilizer applied during planting work performed by the seedling planting machine is changed based on the information. For example, the traveling speed of the combine harvester decreases at a position where crops are overgrown, and thus, the amount of fertilizer applied is reduced at this position. Also, during ploughing work performed by the tractor prior to planting work, the ploughing depth is reduced at a position where crops are overgrown such that the fertilizer does not deposit at this position.

In a field management system in Patent Document 5, data on field work performed by a tractor, a rice transplanter, and a harvester is integrally stored and managed in a layer structure for the purpose of efficient agricultural business management in a field. For example, field outer-shape data is generated based on a travel trajectory that is obtained by the tractor traveling to circulate around the outer periphery of the field, and the generated data is stored. A crop planting position that is generated by the rice transplanter (seeding machine) traveling for work is stored in association with coordinate positions in a field. A yield per unit of travel that is generated in association with the travel position when the harvester travels for harvesting work is associated with a coordinate position in a field, and is stored as a yield per minute parcel in the field.

PRIOR ART DOCUMENTS

Patent Documents

Patent Document 1: JP 2017-055673A
Patent Document 2: JP 2015-112070A
Patent Document 3: JP 2012-191857A
Patent Document 4: JP 2014-187954A
Patent Document 5: JP 2017-068533A

DISCLOSURE OF THE INVENTION

Problem to be Solved by the Invention (1) A problem corresponding to the background art (1) is as follows.

To automatically travel accurately along a set travel path without being affected by the state of a field that significantly varies due to bad weather or the like, not only accurate vehicle position measurement but also high responsiveness of a traveling apparatus (including a steering mechanism), which is subjected to automatic travel control, are required. However, even if these requirements are satisfied, a slip of a wheel or a crawler is a problem for automatic travel in a field. For this reason, actions to be taken when an automatically-traveling vehicle has proceeded into an area where a slip is likely to occur are important.

In view of the foregoing situation, there is a demand for a slip determination system that is capable of providing appropriate control information to a traveling vehicle when the traveling vehicle has proceeded into an area where a slip is likely to occur during automatic travel.

(2) A problem corresponding to the background art (2) is as follows.

In the systems in Patent Documents 4 and 5, agricultural work information regarding various agricultural work machines is integrally managed field-by-field, and thus, the systems can contribute to an increase in the efficiency of agricultural planning. However, regarding calculation of a travel path with which each agricultural work machine automatically travels, no technology has been disclosed that calculates a travel path for an agricultural work machine that is scheduled to carry out agricultural work later, while giving consideration to a work state of an agricultural work machine that has previously carried out agricultural work.

In view of the foregoing situation, an object of the present invention is to provide a travel path calculation technology with which, when a travel path for automatic travel is set, consideration is given to a work state of a field work vehicle that has previously carried out work.

Means for Solving Problem (1) A solving means corresponding to the problem (1) is as follows.

A slip determination system according to the present invention includes: a traveling vehicle body; a vehicle position detection module for detecting a vehicle position; and an automatic travel control portion for enabling automatic travel based on the vehicle position and a set travel path; a slip amount calculation portion for calculating a slip amount of the traveling vehicle body, using an estimated movement distance of the traveling vehicle body calculated based on the number of revolutions of a driving axle of the traveling vehicle body, and an actual movement distance of the traveling vehicle body calculated based on the vehicle position; an appropriateness determination portion for performing appropriateness determination to determine, based on the slip amount, whether or not a state of a traveling ground surface is appropriate for automatic travel; and an automatic travel stop portion for stopping automatic travel enabled by the automatic travel control portion, based on a determination result from the appropriateness determination portion.

This slip determination system determines a slip state of a vehicle that is automatically traveling, and controls the vehicle based on the determination results. The slip amount (including a slip rate) is calculated using an actual movement distance, which is obtained based on the vehicle position that is detected by means of satellite navigation or the like, and an estimated movement distance, that is obtained based on the number of revolutions of the axle. The degree of slipperiness of a traveling surface (working ground surface) on which the vehicle is traveling can be determined based on the obtained slip amount. If the traveling surface is slippery, a position shift (including a direction shift) of the traveling vehicle body may occur due to a slip. If this position shift is significant and frequently occurs, it is difficult to appropriately resolve the position shift through automatic travel control. With this configuration, if a traveling surface is in a state that is not appropriate for automatic travel, the automatic travel is stopped. Thus, the vehicle is suppressed from deviating from a target travel path during automatic travel.

An error may unexpectedly occur in the actual movement distance that is based on the vehicle position obtained using satellite navigation or inertial navigation, due to a bad signal state. For this reason, a configuration may also be employed in which, when appropriateness determination is made based on a slip amount, this appropriateness determination is made based on a plurality of slip amounts that are successively calculated, i.e. based on successive behavior of the slip amount. For example, it is possible to determine an ultimate slip amount and make appropriateness determination based on the statistical calculation results (average calculation, intermediate value calculation etc. in a predetermined period) using a plurality of slip amounts that are successively calculated.

A work vehicle, especially a field work vehicle that performs work in a field more often slips and the amount of slip is larger during turning travel than during straight travel. Thus, a slip during turning travel leads to a significant position shift (including direction shift) from a target travel path. For this reason, in a situation where a slip is likely to occur, turning performance, such as a turning radius and a turning vehicle speed, needs to be adjusted. In a preferable embodiment of the present invention, a turning performance adjustment portion for adjusting turning performance of the traveling vehicle body is provided, and the turning performance adjustment portion adjusts the turning performance if the slip amount exceeds a predetermined value. By adjusting turning performance, the slip amount is reduced. Otherwise, even if a slip is unavoidable, a position shift from the target travel path is suppressed.

In a specific embodiment of the slip determination system that includes the turning performance adjustment portion, as the adjustment of the turning performance, a speed of the traveling vehicle body is increased when straight travel is switched to turning travel. As a result of acceleration during a turn, there is a possibility that a gripping force applied to the ground surface recovers and a slip is suppressed. Also, as a result of acceleration during a turn, there is a possibility that turning travel time is shortened, and a shift from the target travel path due to a slip is also suppressed. Turns of a work vehicle include a power turn, a pivot turn, and a spin turn, and this embodiment is effective in any case.

A field work vehicle, such as a combine harvester, has a tilting mechanism for tilting the traveling vehicle body. The turning radius can be reduced and a slip can be suppressed by tilting the traveling vehicle body. Accordingly, in an embodiment of the present invention, a tilting mechanism for tilting the traveling vehicle body is provided, and, as the adjustment of the turning performance, the traveling vehicle body is tilted such that a turning outer side thereof is raised during a turn. If the tilting orientation during a turn is a tilt in the left-right direction of the traveling vehicle body that raises the turning outer side and lowers the turning center side, turning performance is improved.

Furthermore, if a turn is performed by a hydraulic transmission that uses a hydraulic pack as a system for transmitting a driving force to left and right traveling apparatuses (crawlers, wheels), an engine load may increase and the engine speed may decrease during the turn. In this case, the oil pressure in the hydraulic pack becomes insufficient, and turnability deteriorates. To solve this problem, it is also preferable to increase the engine speed during a turn.

(2) A solving means corresponding to the problem (2) is as follows.

A travel path generation system according to the present invention is a travel path generation system that generates a travel path for performing automatic travel in a field in which work is performed by different types of field work vehicles, and the system includes: a work information acquisition portion for acquiring work information regarding a preceding field work vehicle that has performed work previously in the field; and a path calculation portion for calculating, based on the work information from the work information acquisition portion, the travel path for a subsequent field work vehicle that is to perform automatic travel work hereafter in the field in which work has been performed by the preceding field work vehicle.

According to this configuration, when different types of field work vehicles perform work in the same field, work information regarding a field work vehicle that has performed work previously in this field (preceding field work vehicle) is acquired by the work information acquiring portion. Accordingly, the work state of the preceding field work vehicle can be read from work information that has been acquired by the work information acquiring portion. When a field work vehicle (subsequent field work vehicle) performs work later in the filed in which the preceding field work vehicle has performed work, a travel path through which the subsequent field work vehicle is to automatically travel is calculated while giving consideration to the work state that is read from the work information. Thus, a travel path that is appropriate for the state of the field in which work is to be performed can be calculated, and work efficiency can be improved.

In a preferable embodiment of the present invention, the preceding field work vehicle is a seedling row forming machine that forms seedling rows, such as a seeding machine or a rice transplanter, and the work information regarding the seedling row forming machine includes planted seedling row information indicating a seedling row formation map, the subsequent field work vehicle is a harvester that has a harvesting portion in a machine-body front portion and harvests crops in the field while automatically traveling, and the travel path for the harvester is calculated based on the planted seedling row information by the path calculation portion such that a path extending in a direction in which the seedling rows extend is elongated. When crops are harvested in a field in which planting or the like has been performed using a seedling row forming machine or the like, harvesting efficiency is increased by causing a harvester to travel along seedling rows. Accordingly, by employing the above-described configuration, the number of harvest travel paths that are perpendicular to the seedling rows and harvest travel paths that skew relative to the seedling rows can be minimized, and work efficiency improves.

Calculation of a travel path for a large-scale field and a field with a complex outer shape may not be appropriately performed due to, for example, restrictions of a travel path calculation algorithm. In that case, a dividing path that divides a field into a plurality of portions is set, and a travel path is separately calculated for divided fields that divided by the dividing path. However, if consideration is not given to the position, orientation, and the like of seedling rows in the divided fields in the calculation of the dividing path, a travel path portion that is perpendicular to the seedling rows and a travel path portion that skews relative to the seedling rows may possibly be elongated in a travel path that is calculated for each of the divided field. For this reason, in a preferable embodiment of the present invention, the path calculation portion includes a dividing path calculation portion for calculating a dividing path that divides the field, as one travel path for the harvester, and the dividing path calculation portion calculates the dividing path based on the planted seedling row information, such that the travel path in divided fields that are divided by the dividing path can be readily extended in the direction in which the seedling rows extend.

Furthermore, if a harvesting portion is provided with a plurality of dividers that sort planted grain culms by seedling row, the plurality of dividers are required to accurately proceed between the seedling rows. For this reason, in a preferable embodiment of the present invention, the harvesting portion is provided with dividers that are arranged laterally, and the travel path is corrected so as to optimize positions of the seedling rows on an unworked area side that are calculated based on the planted seedling row information, and a position of one of the dividers, on an end side in a machine-body left-right direction. For example, if, at a boundary between an unharvested area and a harvested area, a divider on an end side in the left-right direction proceeds onto a boundary seedling row in the harvested area that is closest to the unharvested area, or between a boundary seedling row in the harvested area and a boundary seedling row in unworked area, as a result, all of the dividers proceed between the seedling rows, and thus, planted grain culms can be favorably sorted by the dividers.

If a field work vehicle that has large rear wheels, such as a tractor, or has crawler apparatuses travels in a field, large wheel tracks are left in a soft field, and an uneven surface occurs in the field. If a subsequent field work vehicle crosses such an uneven surface, vibration occurs that obstructs precise work travel. In addition, if a ridge is formed by a tractor and a subsequent field work vehicle crosses this ridge, the ridge will be partially destroyed. Accordingly, a travel path is preferable through which a subsequent field work vehicle does not cross an uneven surface or a ridge that is left by a preceding field work vehicle, as much as possible. For this reason, in a preferable embodiment of the present invention, the work information includes ridge information indicating a ridge formation map of ridges formed by a tractor, and the path calculation portion calculates the travel path such that the ridges are less often crossed by the subsequent field work vehicle.

If any of the wheels of a field work vehicle rides up a portion that protrudes upward from the field surface, such as a ridge or a dug portion, the machine body tilts in the left-right direction. In particular, if a tilt occurs during a turn such that the turn inner side is raised and the turn outer side is lowered, the turning travel becomes unstable. For this reason, in a preferable embodiment of the present invention, the work information includes ridge information indicating a ridge formation map of ridges formed by a tractor, and the path calculation portion calculates the travel path such that, when the subsequent field work vehicle turns, a turning inner portion of a traveling apparatus of the subsequent field work vehicle does not ride up the ridges.

The object of the present invention is not only the travel path generation system but also a field work vehicle that employs this travel path generation system. This field work vehicle includes the above-described travel path generation system, and also includes a vehicle position detection module that detects a vehicle position, and an automatic travel control portion that enables automatic travel based on the travel path calculated by the path calculation portion, and the vehicle position. The field work vehicle according to the present invention can utilize all of the effects of the travel path generation system, including the above-described preferable embodiments.

BEST MODE FOR CARRYING OUT THE INVENTION

First Embodiment

Next, a description will be given while taking a normal combine harvester as a harvester that is an example of a field work machine that employs a slip determination system of the present invention. Note that, in the present specification, "front/forward" (a direction indicated by an arrow F shown in FIG. 1) means a forward direction in the machine-body front-rear direction (travel direction), and "rear/rearward" (a direction indicated by an arrow B shown in FIG. 1) means a rearward direction in the machine-body front-rear direction (travel direction), unless otherwise stated. A left-right direction, or a lateral direction, means a machine-body transverse direction (machine-body width direction) that is perpendicular to the machine-body front-rear direction. "Upper/above" (a direction indicated by an arrow U shown in FIG. 1) and "lower/below" (a direction indicated by an arrow D shown in FIG. 1) refers to a positional relationship in the vertical direction of a vehicle body, and indicates a relationship in terms of a ground height.

Figure 1:
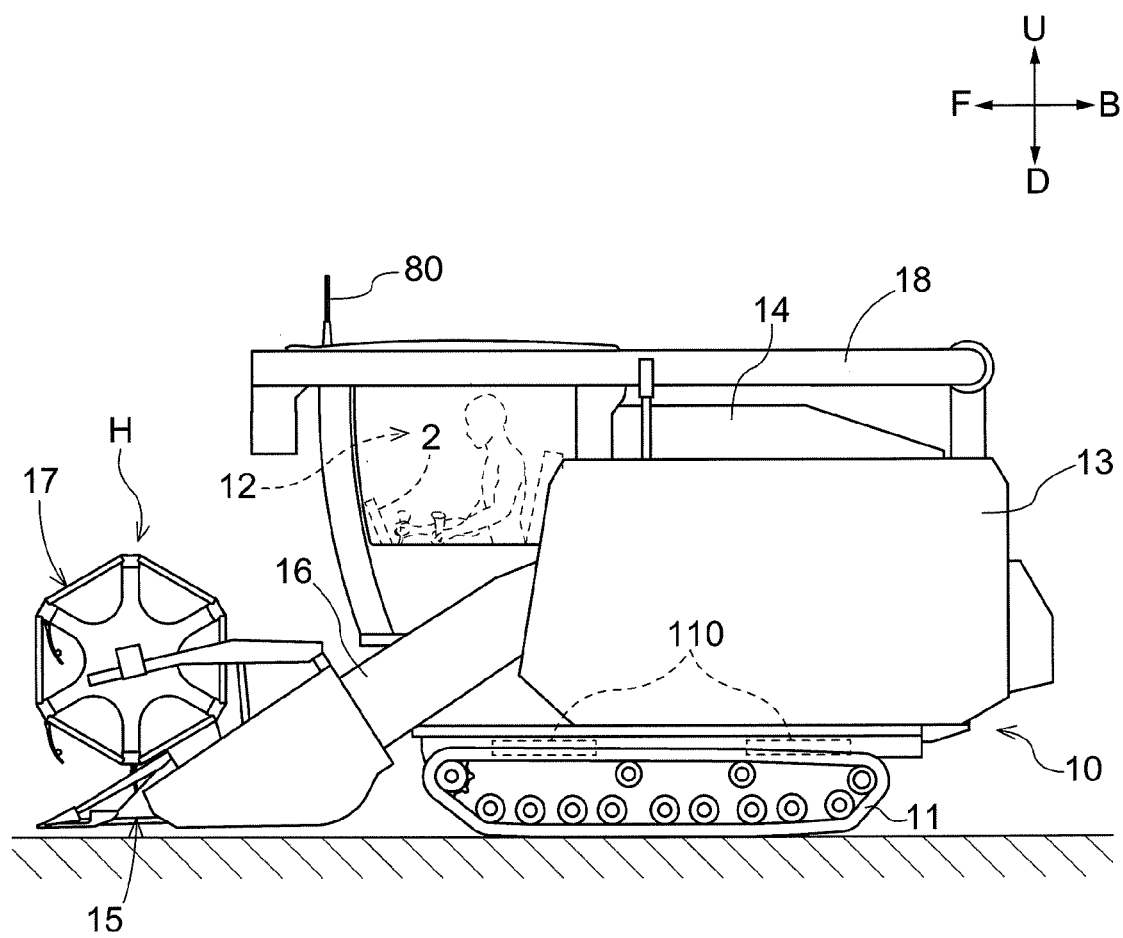
FIG. 1 shows a first embodiment (which also applies to FIGS. 2 to 5), and is a side view of a combine harvester, which is an example of a harvester that employs a slip determination system.

As shown in FIG. 1, this combine harvester is called a normal combine harvester, and includes a traveling vehicle body 10, crawler-type traveling apparatuses 11, an operation section 12, a threshing apparatus 13, a grain tank 14, a harvesting portion H, a conveyance apparatus 16, a grain discharge apparatus 18, and a vehicle position detection module 80.

The traveling apparatuses 11 are provided below the traveling vehicle body 10 (hereinafter referred to simply as a vehicle body 10). The combine harvester is configured to be automotive with the traveling apparatuses 11. The operation section 12, the threshing apparatus 13, and the grain tank 14 are provided above the traveling apparatuses 11, and constitute the upper part of the vehicle body 10. An operator who operates the combine harvester or an observer who monitors work of the combine harvester can board the operation section 12. Usually, an operator also serves as an observer. Note that, if an operator differs from an observer, the observer may monitor work of the combine harvester from outside the combine harvester.

The grain discharge apparatus 18 is coupled to a rear lower portion of the grain tank 14. The vehicle position detection module 80 is attached to an upper front portion of the operation section 12.

The harvesting portion H is provided in a front portion of the combine harvester. The conveyance apparatus 16 is provided on the rear side of the harvesting portion H. The harvesting portion H has a cutting mechanism 15 and a reel 17. The cutting mechanism 15 reaps planted grain culms in the field. The reel 17 rakes planted grain culms to be harvested, while being driven to rotate. With this configuration, the harvesting portion H harvests grains (a kind of farm produce) in the field. The combine harvester can travel for work, i.e. travel using the traveling apparatuses 11 while harvesting crops in the field using the harvesting portion H.

Reaped grain culms that have been reaped by the cutting mechanism 15 are conveyed to the threshing apparatus 13 by the conveyance apparatus 16. The reaped grain culms undergo a threshing process in the threshing apparatus 13. Grains obtained through the threshing process are stored in the grain tank 14. The grains stored in the grain tank 14 are discharged to the outside of the machine body by the grain discharge apparatus 18, as needed. Note that, in this combine harvester, a hydraulic tilting mechanism 110 is provided between the vehicle body 10 and the traveling apparatus 11, and can tilt the vehicle body 10 in the left-right direction and the front-rear direction relative to a traveling surface (field surface).

A communication terminal 2 is disposed in the operation section 12. In this embodiment, the communication terminal 2 is fixed to the operation section 12. However, the present invention is not limited thereto, and the communication terminal 2 may be attachable to and detachable from the operation section 12, or may be located outside the machine body of the combine harvester.

Figure 2:
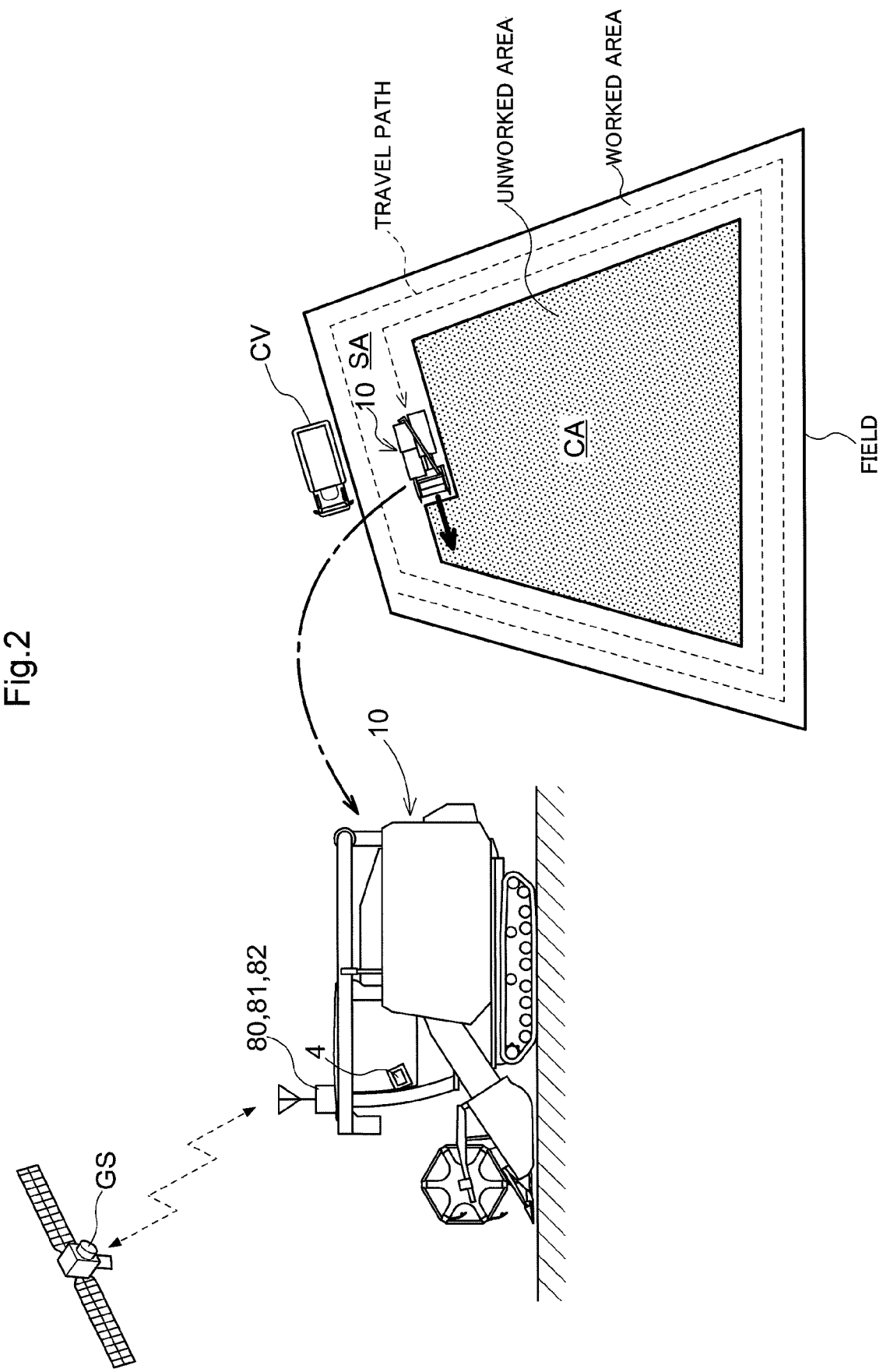
FIG. 2 shows an overview of automatic travel of the combine harvester.

As shown in FIG. 2, this combine harvester automatically travels along a travel path that is set in a field. For this purpose, the vehicle position is needed. The vehicle position detection module 80 includes a satellite navigation module 81 and an inertial navigation module 82. The satellite navigation module 81 receives a GNSS (global navigation satellite system) signal (including a GPS signal) from an artificial satellite GS, and outputs positioning data for calculating the vehicle position. The inertial navigation module 82 contains a gyro/acceleration sensor and a magnetic direction sensor, and outputs a position vector that indicates an instantaneous travel direction. The inertial navigation module 82 is used to complement vehicle position calculation performed by the satellite navigation module 81. The inertial navigation module 82 may be disposed in a place separate from the satellite navigation module 81.

A Procedure Employed in the Case of Performing Harvest Work in a Field Using this Combine Harvester is as Described Below.

First, an operator/observer manually operates the combine harvester, and travels for harvesting so as to circulate along a boundary line of the field in an outer-peripheral portion within the field, as shown in FIG. 2. An area that has thus become a harvested area (worked area) is set as an outer-peripheral area SA. An area that is left as an unharvested area (unworked area) inward of the outer-peripheral area SA is set as a work target area CA.

At this time, the operator causes the combine harvester to travel to circulate three to four times in order to secure the width of the outer-peripheral area SA widely to some extent. During this travel, the width of the outer-peripheral area SA increases by the working width of the combine harvester, every time the combine harvester circulates once. After the combine harvester has finished traveling to circulate three to four times at the beginning, the width of the outer-peripheral area SA is the width that is equal to three to four times the working width of the combine harvester.

The outer-peripheral area SA is used as a space with which the combine harvester changes its direction when traveling to harvest in the work target area CA. The outer-peripheral area SA is also used as a space when the combine harvester moves to a grain discharging area after finishing harvest travel, and as a space for moving when the combine harvester moves to a refueling area, for example.

Note that a carrier vehicle CV shown in FIG. 2 can collect and transport grains discharged from the combine harvester. When grains are discharged, the combine harvester moves to the vicinity of the carrier vehicle CV and thereafter discharges the grains to the carrier vehicle CV, using the grain discharge apparatus 18.

Figure 3:
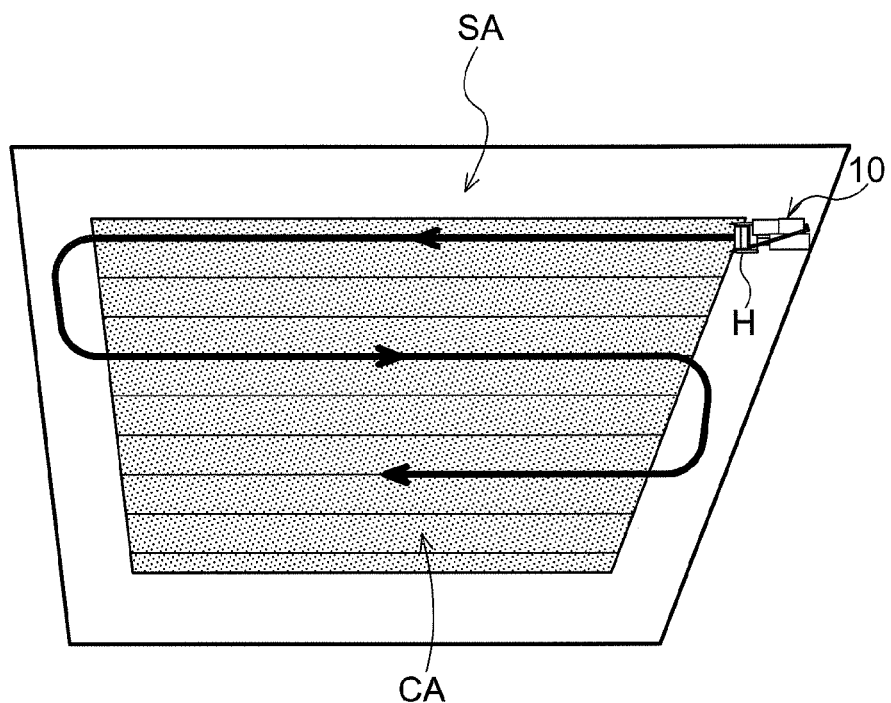
FIG. 3 shows a travel path for automatic travel.

Upon the outer-peripheral area SA and the work target area CA being set, a travel path in the work target area CA is calculated, as shown in FIG. 3. The calculated travel path is sequentially set based on a work travel pattern, and the combine harvester is subjected to automatic travel control so as to travel along the set travel path.

Figure 4:
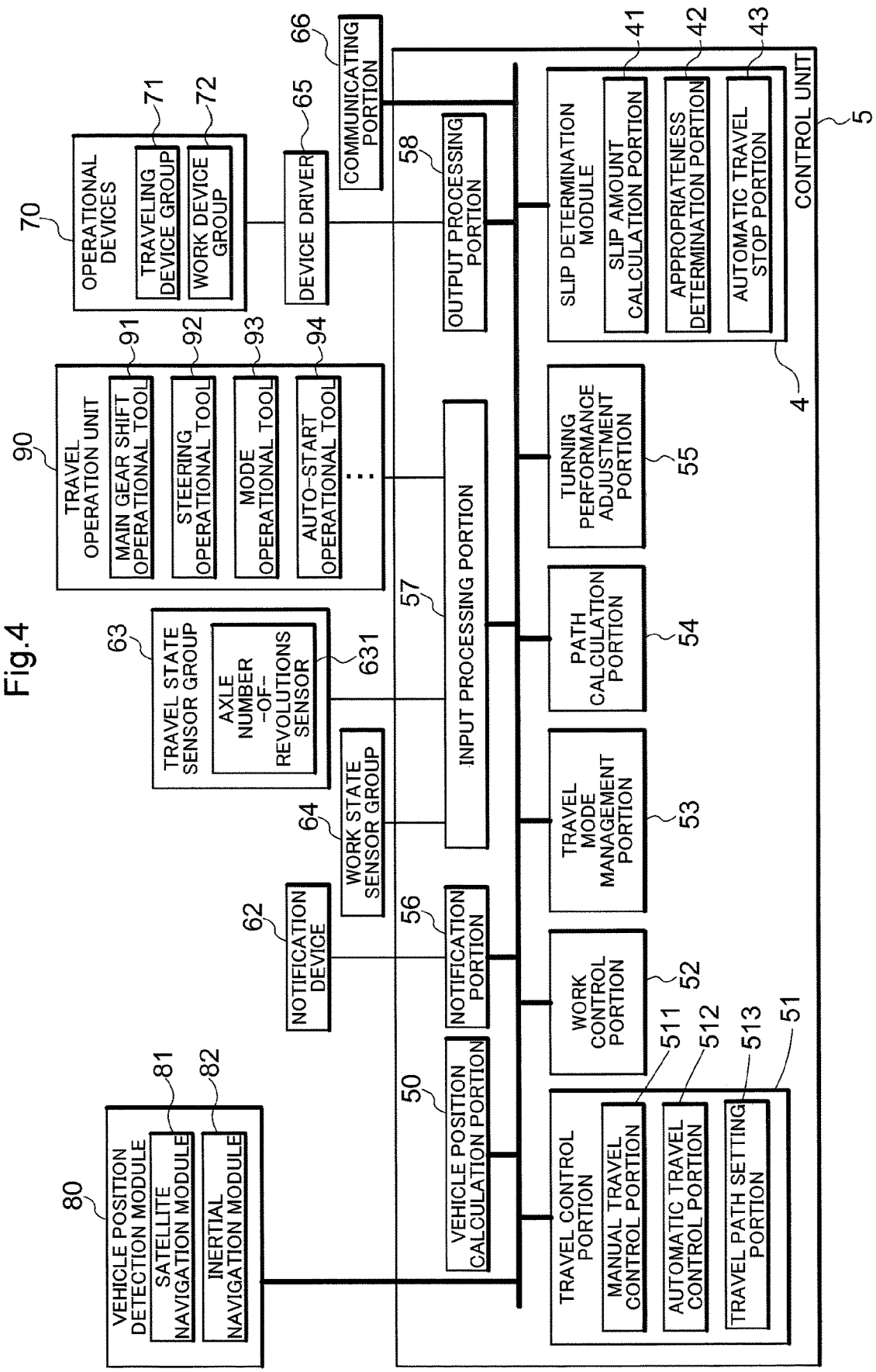
FIG. 4 is a functional block diagram showing a configuration of a control system of the combine harvester.

FIG. 4 shows a control system of the combine harvester that uses the slip determination system according to the present invention. The control system of the combine harvester is constituted by a control unit 5, which includes by a large number of electronic control units called ECUs, and various input-output devices that perform signal communication (data communication) with the control unit 5 through a wired network, such as an in-vehicle LAN.

A notification device 62 is a device for notifying the operator or the like of a work travel state and various warnings, and may be as a buzzer, a lamp, a speaker, a display, or the like. A communicating portion 66 is used for the control system of the combine harvester to exchange data with communication terminals 2 or a management computer that is installed in a remote place. The communication terminals 2 may include a tablet computer that is operated by the observer who is standing in the field or the operator/observer who is sitting in the combine harvester, and a computer installed at home or in a management office, for example. The control unit 5 is a core element of this control system, and is illustrated as an aggregate of a plurality of ECUs. A signal from the vehicle position detection module 80 is input to the control unit 5 through the in-vehicle LAN.

The control unit 5 includes an output processing portion 58 and an input processing portion 57 as input and output interfaces. The output processing portion 58 is connected to various operational devices 70 via a device driver 65. The operational devices 70 include a traveling device group 71, which is constituted by travel-related devices, and a work device group 72, which is constituted by work-related devices. The traveling device group 71 includes, for example, an engine control device, a gear shift control device, a brake control device, a steering control device, and the like. The work device group 72 includes motive power control devices in the harvesting portion H, the threshing apparatus 13, the conveyance apparatus 16, the grain discharge apparatus 18, the tilting mechanism 110, and the like.

A travel state sensor group 63, a work state sensor group 64, a travel operation unit 90, and the like, are connected to the input processing portion 57. The travel state sensor group 63 includes an axle number-of-revolutions sensor 631 that detects the number of revolutions of an axle that is directly related to the ground speed of the traveling apparatuses 11. An estimated vehicle speed, which is an estimated movement distance per unit of time, can be calculated based on a detection signal from the axle number-of-revolutions sensor 631. The estimated movement distance (estimated vehicle speed) is an actual movement distance (actual vehicle speed) if no slip occurs. The travel state sensor group 63 also includes other sensors, such as an engine speed sensor, an overheat detection sensor, a brake pedal position detection sensor, a gear shift position detection sensor, a steering position detection sensor, and the like. The work state sensor group 64 includes sensors for detecting a driving state of harvest work apparatuses (the harvesting portion H, the threshing apparatus 13, the conveyance apparatus 16, and the grain discharge apparatus 18), and sensors for detecting the state of grain culms and grains, and includes, for example, a reaping/threshing sensor, a grain capacity sensor, and the like.

The travel operation unit 90 is a generic term of operational tools that are manually operated by the operator and whose operation signal is input to the control unit 5. The travel operation unit 90 includes a main gear shift operational tool 91, a steering operational tool 92, a mode operational tool 93, an auto-start operational tool 94, and the like. The mode operational tool 93 has a function of giving the control unit 5 a command to switch between automatic operation and manual operation. The auto-start operational tool 94 has a function of giving the control unit 5 an ultimate auto-start command for starting automatic travel. In this embodiment, the auto-start operational tool 94 is constituted by two buttons, and the auto-start command is not sent out unless a first button (first operation device) and a second button (second operation device) are operated simultaneously. Note that, an automatic travel mode, in which automatic operation is performed, can be switched to a manual travel mode, in which manual operation is performed, by software in the control unit 5, regardless of the operations performed with the mode operational tool 93. For example, if a situation occurs in which automatic operation cannot be performed, the control unit 5 forcibly switches from the automatic travel mode to the manual travel mode. When the mode is thus switched, the combine harvester temporarily stops.

The control unit 5 includes a vehicle position calculation portion 50, a travel control portion 51, a work control portion 52, a travel mode management portion 53, a path calculation portion 54, a turning performance adjustment portion 55, and a slip determination module 4. The vehicle position calculation portion 50 calculates a vehicle position, which is the map coordinates (or field coordinates) of a preset specific portion of the vehicle body 10, based on the positioning data that is sequentially sent from the vehicle position detection module 80. A notification portion 56 generates notification data based on a command or the like from the functional portions of the control unit 5, and gives the generated notification data to the notification device 62.

The travel control portion 51 has an engine control function, a steering control function, a vehicle speed control function, and the like, and gives a control signal to the traveling device group 71. The work control portion 52 gives a control signal to the work device group 72 in order to control operations of the harvest work apparatuses (the harvesting portion H, the threshing apparatus 13, the conveyance apparatus 16, the grain discharge apparatus 18, etc.)

This combine harvester can travel by both automatic operation to perform harvest work while automatically traveling and manual operation to perform harvest work while manually traveling. For this reason, the travel control portion 51 includes a manual travel control portion 511, an automatic travel control portion 512, and a travel path setting portion 513. Note that the automatic travel mode is set when automatic operation is performed, and the manual travel mode is set to perform manual operation. These travel modes are managed by the travel mode management portion 53.

If the automatic travel mode is set, the automatic travel control portion 512 generates control signals for changing vehicle speed, including automatic steering and stop, to control the traveling device group 71. A control signal related to automatic steering is generated so as to resolve a position shift (including an orientation shift) between the target travel path that is set by the travel path setting portion 513 and the vehicle position calculated by the vehicle position calculation portion 50. A control signal related to a change in vehicle speed is generated based on a vehicle speed value that is set in advance. The travel path set by the travel path setting portion 513 is calculated by a path calculation algorithm that is registered in the path calculation portion 54.

If the manual travel mode is selected, the manual travel control portion 511 generates a control signal to control the traveling device group 71 based on an operation performed by the operator, and thus, manual operation is realized. Note that the travel path calculated by the path calculation portion 54 can be used, even during manual operation, for the purpose of guidance for the combine harvester to travel along this travel path.

Switching between the automatic travel mode of performing automatic operation and the manual travel mode of performing manual operation is not performed directly, but with intervention of transition modes. An automatic waiting mode is prepared as a transition mode for switching from the manual travel mode to the automatic travel mode. Also, a pause mode of pausing the vehicle body 10 during automatic operation and a checking mode serving as a final stage of the switching from the pause mode to the manual travel mode are prepared as transition modes for switching from the automatic travel mode to the manual travel mode. Switching conditions are set for the switching between the automatic travel mode, the manual travel mode, and the transition modes that connect these travel modes. The travel mode management portion 53 determines whether or not any of these switching conditions holds, and manages switching to a corresponding mode.

The turning performance adjustment portion 55 adjusts turning performance of the vehicle body 10 in accordance with information from the travel state sensor group 63, the work state sensor group 64, and the slip determination module 4. Items of turning performance adjustment include changing a difference in speed between the left and right traveling apparatuses 11, accelerating the turning vehicle speed (increasing the speed when switching from straight travel to turning travel), driving the tilting mechanism 110 during a turn to tilt the vehicle body 10 such that the turning outer side is raised, and the like.

In this embodiment, a pair of left and right hydrostatic transmissions are interposed in a motive power transmission path from an engine to the traveling apparatuses 11 to change speed. The vehicle body 10 turns due to a difference in the speed change between the left and right hydrostatic transmissions. The oil pressure is supplied to the hydrostatic transmissions by a hydraulic circuit that includes a hydraulic pump called a hydraulic pack. To normally operate the hydrostatic transmissions, the oil pressure of the hydraulic pack, which is driven by the engine, needs to be sufficiently secured. However, if a travel load increased during a turning travel or the like, the engine speed may temporarily decrease, or a slip may occur in the hydrostatic transmissions. The oil pressure of the hydraulic pack may then become insufficient due to insufficient rotation of the hydraulic pump, and the turnability deteriorates. For this reason, the turning performance adjustment portion 55 also has a function of increasing the engine speed during such a turn.

The slip determination module 4 includes a slip amount calculation portion 41, an appropriateness determination portion 42, and an automatic travel stop portion 43. The slip amount calculation portion 41 calculates a slip amount (or a slip rate) of the vehicle body 10 (traveling apparatuses 11) using the estimated movement distance per unit of time of the vehicle body 10 that is calculated based on the number of revolutions of a driving axle obtained from the axle number-of-revolutions sensor 631, and the actual movement distance per unit of time of the vehicle body 10 that is calculated based on the vehicle position obtained from the vehicle position calculation portion 50. Note that the slip amount can also be obtained using an estimated time required to move by a unit travel distance, and an actual time.

The appropriateness determination portion 42 makes an appropriateness determination, i.e. determines, based on the slip amount, whether or not the state of the traveling ground surface is appropriate for automatic operation (automatic travel) in the automatic travel mode. If a slip amount that exceeds an allowable slip amount is detected, the appropriateness determination portion 42 determines that the traveling ground surface is in a state that is not appropriate for automatic travel. The slip amount that is allowable in automatic travel (allowable slip amount) is preset. The allowable slip amount may be adjusted depending on the specifications of the combine harvester, or may be adjusted for each field. Furthermore, the allowable slip amount can also be adjusted based on a decision by the observer. In this embodiment, the appropriateness determination portion 42 sets, as a slip amount for the appropriateness determination, successive behavior, e.g. an average of a plurality of slip amounts that are successively calculated, excluding the largest and smallest values thereof, while giving consideration to a sudden signal error, computation error or the like.

If, during automatic travel, the appropriateness determination portion 42 determines that a slip amount that is not appropriate for automatic travel has occurred, the automatic travel stop portion 43 gives the travel mode management portion 53 a command to switch from the automatic travel mode to the manual travel mode to stop automatic travel. Upon receiving the automatic travel stop command from the automatic travel stop portion 43, the travel mode management portion 53 sets the travel mode to the manual travel mode and stops the vehicle body 10.

Figure 5:
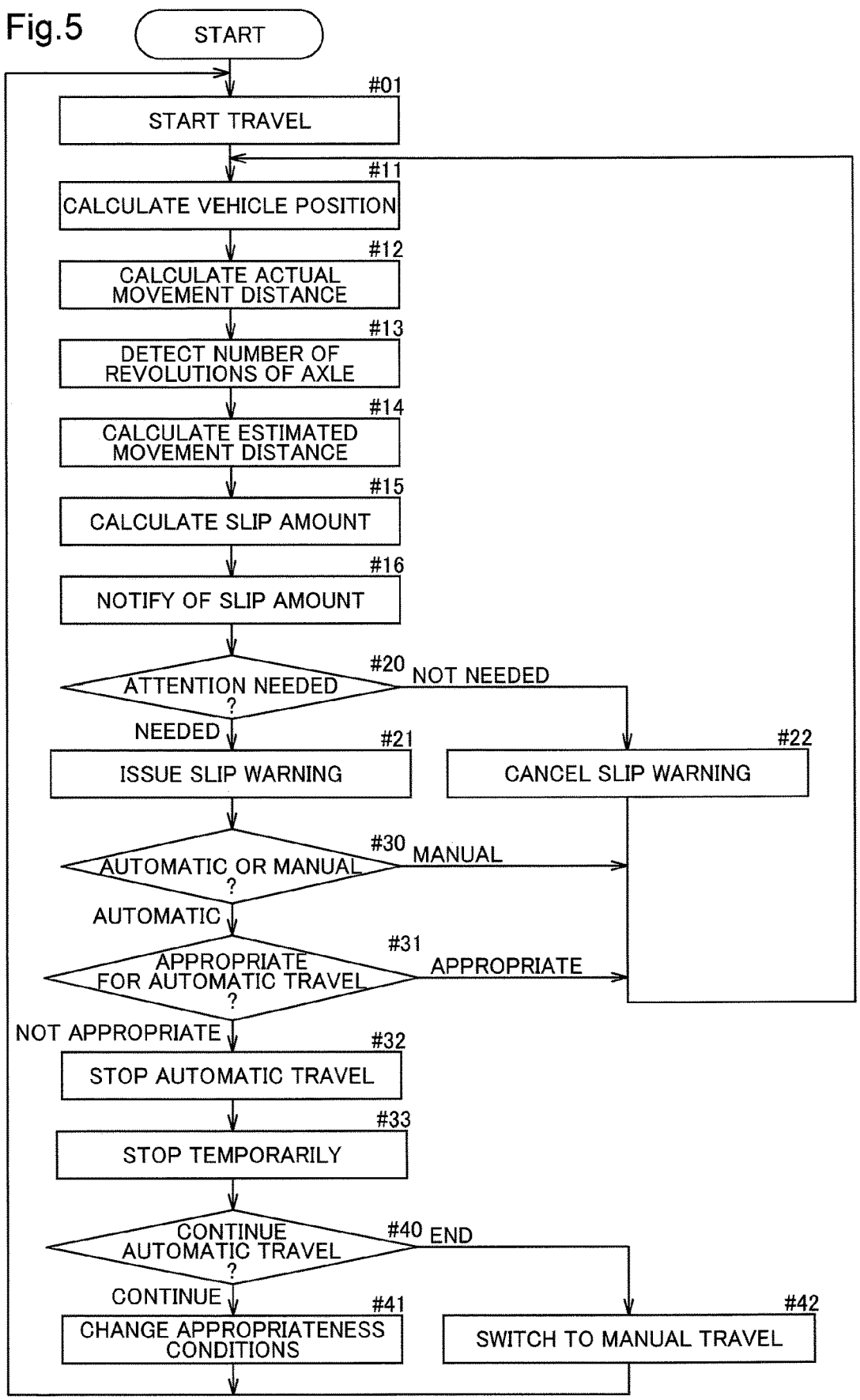
FIG. 5 is a flowchart showing travel control for the combine harvester that is based on slip determination.

Next, a control flow related to slip determination processing will be described with reference to the flowchart in FIG. 5.

Processing for detecting a slip starts upon the combine harvester traveling (#01). First, the vehicle position is calculated by the vehicle position calculation portion 50 (#11). An actual movement distance, which is an actual movement distance per unit of time, is calculated based on a difference between two vehicle positions that are calculated with a predetermined time interval (#12). Furthermore, the number of revolutions of the driving axle per unit of time is detected by the axle number-of-revolutions sensor 631 (#13). An estimated movement distance per unit of time is calculated based on the detected number of revolutions (#14). The slip amount calculation portion 41 calculates a slip amount based on a difference between the actual movement distance and the estimated movement distance (#15). A notification of the calculated slip amount is given through the notification portion 56 and the notification device 62 in the form of a meter indication, a numerical indication, or the like (#16).

It is checked whether or not the road surface state is likely to cause a slip, based on the tendency of the slip amounts that are calculated continuously (#20). A preset attentional threshold is used in this check. If it is determined that attention needs to be paid to slipping (#20; "needed" branch), a slip warning is issued to give a notification indicating that attention needs to be paid to a slip (#21). If it is determined that attention does not need to be paid to slipping (#20: "not needed" branch), and if a slip warning has been issued by this point, this slip warning is canceled (#22). If a slip warning has not been issued, the processing returns to step #11 as-is.

If it is determined that attention needs to be paid to slipping (#20; "needed" branch), it is further checked whether or not the current travel mode is the automatic travel mode (during automatic travel) or the manual travel mode (during manual travel) (#30). If the combine harvester is manually traveling (#30; "manual" branch), the processing returns to step #11 as-is. If the combine harvester is automatically traveling (#30; "automatic" branch), the appropriateness determination portion 42 further determines whether or not automatic travel may be continued in the current slipping situation, based on the calculated slip amount (#31). In this appropriateness determination as well, a predetermined value of slip amount that serves as a determination criterion is used, or successive behavior of the slip amount is used as a determination criterion. If it is determined that automatic travel may still be continued in the current slipping situation (#31; "appropriate" branch), the processing returns to step #11. If it is determined that continuation of automatic travel should be avoided in the current slipping situation (#31; "not appropriate" branch), automatic travel controlled by the automatic travel control portion 512 is stopped (#32). The combine harvester temporarily stops accordingly (#33).

Next, the notification portion 56 asks the observer/operator about whether or not to further continue automatic travel (#40). If the observer/operator wants to continue automatic travel and gives a command to continue automatic travel (#40; "continue" branch), conditions for the appropriateness determination performed by the appropriateness determination portion 42 are slightly mitigated (#41), the processing returns to step #01, and automatic travel is resumed. If the observer/operator abandons continuation of automatic travel and gives a command to switch to manual travel (#40; "end" branch), the travel mode is switched to the manual travel mode, the processing returns to step #01, and manual travel is started.

Variations of First Embodiment (1) In the above embodiment, a combination of the satellite navigation module 81 and the inertial navigation module 82 is used as the vehicle position detection module 80. However, only the satellite navigation module 81 may be used. To calculate an actual movement distance, a method of calculating a movement distance per unit of time based on an image captured by a camera may alternatively be employed.

(2) The functional portions shown in FIG. 4 are divided mainly for the purpose of description. In practice, each of the functional portions may be integrated with other functional portions, or may be divided into a plurality of functional portions. Furthermore, of the functional portions built in the control unit 5, all or some of the travel mode management portion 53, the path calculation portion 54, the turning performance adjustment portion 55, and the slip determination module 4 may be built in a portable communication terminal 2 (a tablet computer etc.) that can be brought into the combine harvester, and may employ a configuration in which those portions exchange data with the control unit 5 wirelessly or via the in-vehicle LAN.

(3) In the above embodiment, the observer manually operates the combine harvester, travels for harvesting so as to circulate along a boundary line of the field in the outer-peripheral portion within the field as shown in FIG. 2, and thereafter calculates a travel path and switches to automatic operation. However, the present invention is not limited thereto. An operation method may alternatively be employed in which the combine harvester is automatically operated from the beginning, and the automatic operation is switched to manual operation when a special event happens.

(4) In the above embodiment, if the appropriateness determination portion 42 determines that automatic travel cannot be continued, automatic travel in the automatic travel mode is stopped, and the vehicle body 10 temporarily stops. Instead, a configuration may alternatively be employed in which, if the appropriateness determination portion 42 determines that automatic travel cannot be continued, the automatic travel mode is forcibly switched to the manual travel mode, only a notification indicating the switching is given, and the vehicle body 10 continues to travel.

(5) The present invention is applicable to not only normal combine harvesters, but also self-threshing combine harvesters. The present invention is also applicable to various harvesters, such as a corn harvester, a potato harvester, a carrot harvester, and a sugarcane harvester, and field work vehicles, such as rice transplanters and tractors. Furthermore, the present invention is also applicable to lawn mowers and construction machines.

Second Embodiment

Basic Configuration of Travel Path Generation System

Figure 6:
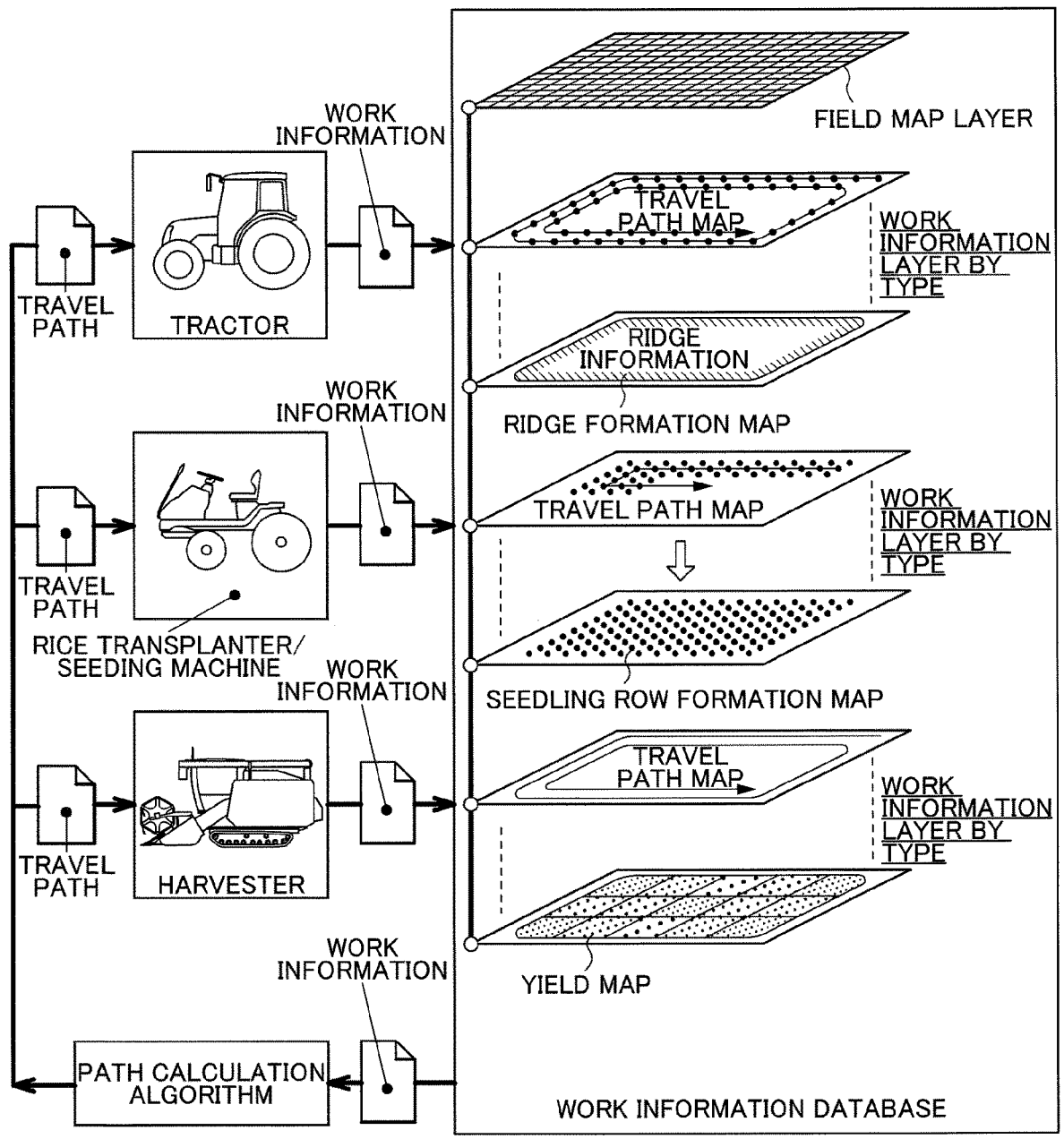
FIG. 6 shows a second embodiment (which also applies to FIGS. 7 to 12), and is a schematic diagram showing a basic configuration of a travel path generation system.

The basic principle of the travel path generation system according to the present invention will be described with reference to FIG. 6. This travel path generation system generates a travel path through which different types of field work vehicles automatically travel in a field. FIG. 6 shows a tractor, a rice transplanter (which may alternatively be a seeding machine), and a harvester (a normal combine harvester), as field work vehicles that perform work in the same field at different times.

The rice transplanter and the seeding machine form rows of seedlings, which are planted grain culms, in the field, and are therefore also called seedling row forming machines. Work information, which includes a travel path map that indicates a travel trajectory of a preceding field work vehicle that has performed work previously in the field, is stored and managed in a work information database or the like. A travel path for a subsequent field work vehicle that is about to work hereafter is calculated while giving consideration to the work information regarding the preceding field work vehicle that has performed work previously.

If the subsequent field work vehicle that is to work hereafter is a harvester such as a combine harvester, planted seedling row information, which includes a seedling row formation map that indicates seedling rows formed by the seeding machine or the rice transplanter that has performed work previously, is stored as work information and managed in the work information database or the like. Thus, this seedling row formation map can be used to calculate a travel path for the harvester. For example, a path calculation algorithm for calculating a travel path can calculate a travel path for the harvester such that a travel path portion extending in a direction in which seedling rows extend is elongated, while giving consideration to the seedling row formation map.

If the subsequent field work vehicle that is to work hereafter is a harvester such as a combine harvester, ridge information, which includes a ridge formation map that indicates positions of ridges formed by a tractor that has performed work previously, and is stored as work information and managed in the work information database or the like. Thus, the ridge formation map can be used to calculate a travel path for the harvester. For example, the path calculation algorithm can calculate a travel path for the harvester such that the harvester less often crosses the ridges, while giving consideration to the ridge formation map. Furthermore, when the harvester turns, the path calculation algorithm can calculate a travel path for the harvester such that a traveling apparatus (crawler; wheel) on the turning inner side of the harvester does not ride up a ridge.

Conventionally, if the scale of the field in which a field work vehicle performs work is large, or if the field has a complex outer shape, a method is employed in which a dividing path is determined at the beginning of work, and the field is divided into two or more sections by the field work vehicle traveling for work through the dividing path. To employ the dividing path in the present invention as well, the path calculation algorithm can also be provided with a function of calculating the dividing path. With this path calculation algorithm, the dividing path is calculated based on the seedling row formation map that is read out from the work information that is stored and managed, such that travel paths in divided fields divided by the dividing path can be readily extended in the direction in which the seedling rows extend.

The work information related to work performed by different types of field work vehicles in the same field is stored after divided into a field map layer and work information layers for the respective types, as schematically shown in FIG. 6. Thus, management of the work information is facilitated. The work information layers in which work information regarding the respective types of field work vehicles is stored include travel path maps (all types), a seedling row formation map (rice transplanter or seeding machine), a ridge formation map (tractor), a yield map (harvester), and the like.

Overall Configuration of Combine Harvester

Next, a description will be given while taking a normal combine harvester as a harvester that is an example of a field work machine that employs the travel path generation system of the present invention. Note that, in the present specification, "front/forward" (a indicated by an arrow F shown in FIG. 7) means a forward direction in the machine-body front-rear direction (travel direction), and "rear/rearward" (a direction indicated by an arrow B shown in FIG. 7) means a rearward direction in the machine-body front-rear direction (travel direction), unless otherwise stated. A left-right direction, or a lateral direction, means a machine-body transverse direction (machine-body width direction) that is perpendicular to the machine-body front-rear direction. "Upper/above" (a direction indicated by an arrow U shown in FIG. 7) and "lower/below" (a direction indicated by an arrow D shown in FIG. 7) refers to a positional relationship in the vertical direction of a vehicle body, and indicates a relationship in terms of a ground height.

Figure 7:
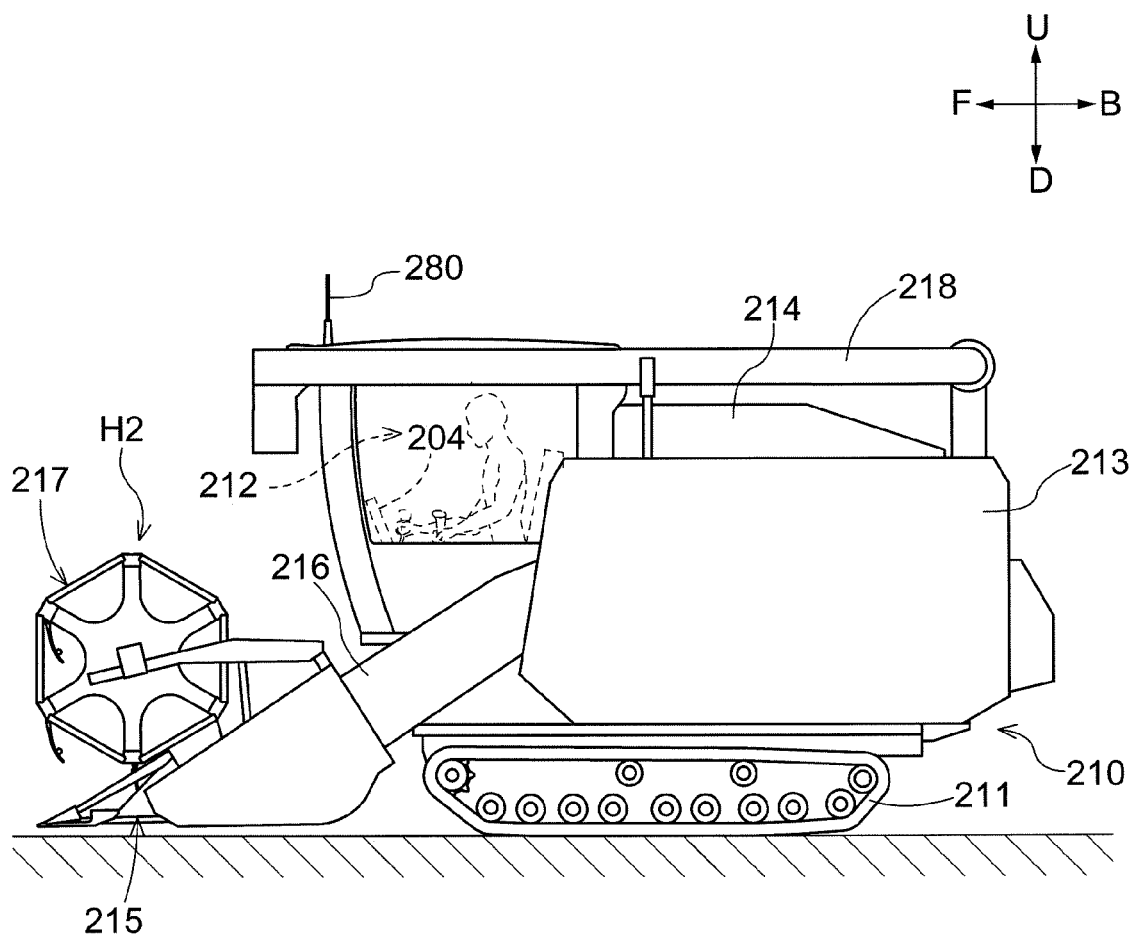
FIG. 7 is a side view of a normal combine harvester, which is an example of a harvester.

As shown in FIG. 7, the combine harvester includes a machine body 210, crawler-type traveling apparatuses 211, an operation section 212, a threshing apparatus 213, a grain tank 214, a harvesting portion H2, a conveyance apparatus 216, a grain discharge apparatus 218, and a satellite positioning module 280.

The traveling apparatuses 211 are provided below the machine body 210. The combine harvester is configured to be automotive with the traveling apparatuses 211. The operation section 212, the threshing apparatus 213, and the grain tank 214 are provided above the traveling apparatuses 211 and constitute the upper part of the machine body 210. An operator who operates the combine harvester or an observer who monitors work of the combine harvester can board the operation section 212. Note that the observer may monitor the work of the combine harvester from outside the combine harvester.

The grain discharge apparatus 218 is coupled to a rear lower portion of the grain tank 214. The satellite positioning module 280 is attached to the upper front portion of the operation section 212.

The harvesting portion H2 is provided in a front portion of the machine body 210. The conveyance apparatus 216 is provided on the rear side of the harvesting portion H2. The harvesting portion H2 has a cutting mechanism 215 and a reel 217.

The cutting mechanism 215 reaps planted grain culms in the field. The reel 217 rakes planted grain culms to be harvested, while being driven to rotate. This configuration enables the combine harvester to travel for work using the traveling apparatuses 211, while harvesting grains (a kind of farm produce) in the field using the harvesting portion H2.

Reaped grain culms reaped by the cutting mechanism 215 are conveyed to the threshing apparatus 213 by the conveyance apparatus 216. The reaped grain culms undergo a threshing process in the threshing apparatus 213. The grains (a kind of harvest) obtained through the threshing process are stored in the grain tank 214. The grains stored in the grain tank 214 are discharged to the outside of the vehicle by the grain discharge apparatus 218, as needed.

A communication terminal 204 is disposed in the operation section 212. In this embodiment, the communication terminal 204 is fixed to the operation section 212. The communication terminal 204 may be attachable to and detachable from the operation section 212, or may be located outside the machine body of the combine harvester.

Configuration Related to Automatic Travel

Figure 8:
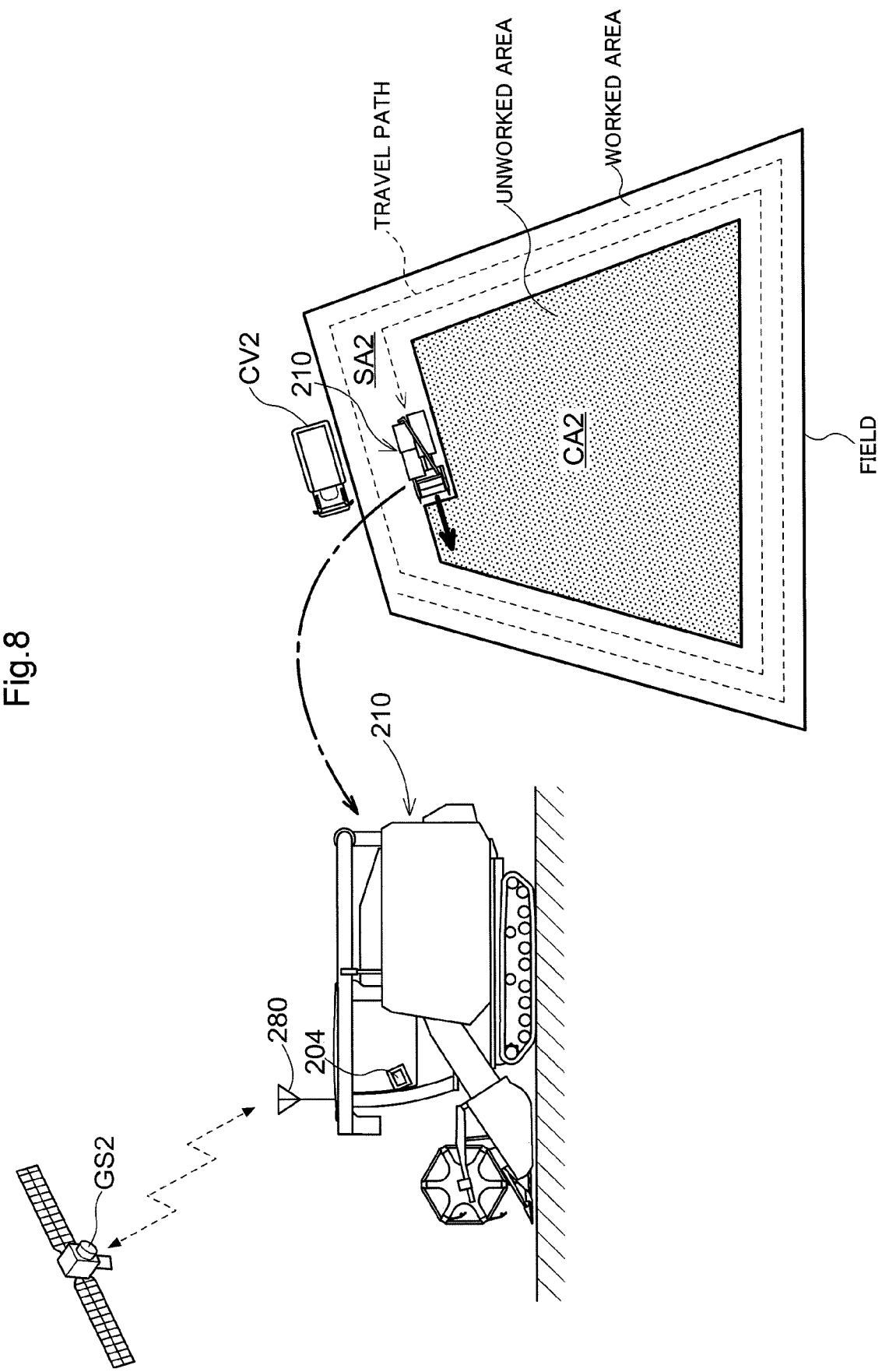
FIG. 8 shows an overview of automatic travel of the normal combine harvester.

As shown in FIG. 8, this combine harvester can automatically travel along a travel path that is set in a field. For this purpose, the satellite positioning module 280 receives a GNSS (global navigation satellite system) signal (including a GPS signal) from an artificial satellite GS2, and outputs positioning data for calculating a vehicle position. The vehicle position is calculated based on this positioning data.

A procedure employed in the case of performing harvest work in a field using this combine harvester is as described below.

First, an operator/observer manually operates the combine harvester, and travels for harvesting so as to circulate along a boundary line of the field in an outer-peripheral portion within the field, as shown in FIG. 8. An area that has thus become a harvested area is set as an outer-peripheral area SA2. An area that is left as an unharvested area inward of the outer-peripheral area SA2 is set as a work target area CA2.

At this time, the observer causes the combine harvester to travel to circulate three to four times in order to secure the width of the outer-peripheral area SA2 widely to some extent. During this travel, the width of the outer-peripheral area SA2 increases by the working width of the combine harvester, every time the combine harvester circulates once. After the combine harvester has finished traveling to circulate three to four times at the beginning, the width of the outer-peripheral area SA2 is the width that is equal to three to four times the working width of the combine harvester.

The outer-peripheral area SA2 is used as a space with which the combine harvester changes its direction when traveling to harvest in the work target area CA2. The outer-peripheral area SA2 is also used as a space when the combine harvester moves to a grain discharging area after finishing harvest travel, and as a space for moving when the combine harvester moves to a refueling area, for example.

Note that a carrier vehicle CV2 shown in FIG. 8 can collect and transport grains discharged from the combine harvester. When grains are discharged, the combine harvester moves to the vicinity of the carrier vehicle CV2 and thereafter discharges the grains to the carrier vehicle CV2, using the grain discharge apparatus 218.

Figure 9:
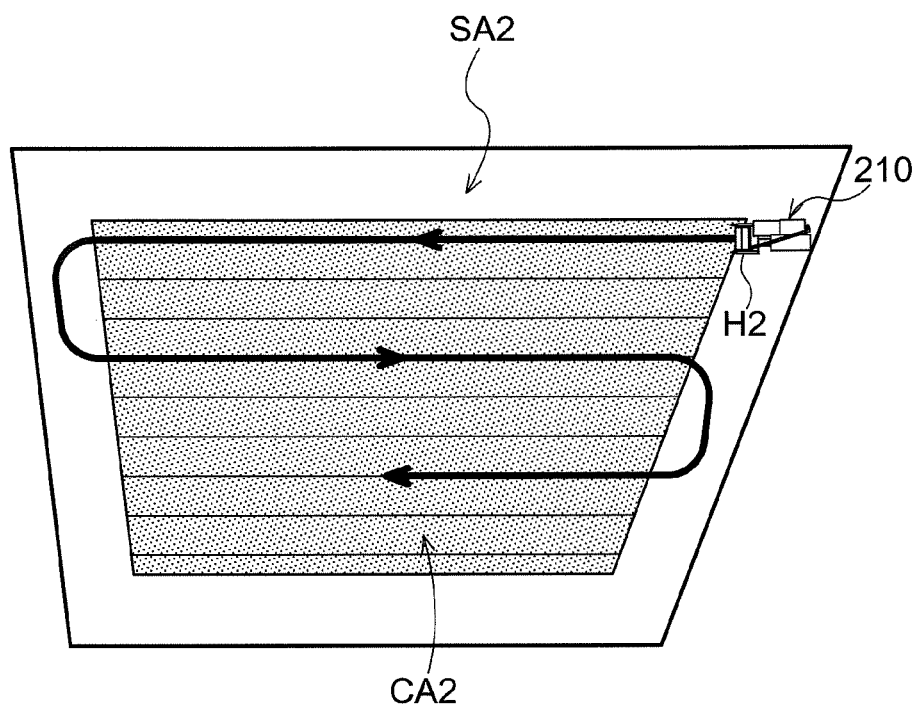
FIG. 9 shows a travel path for automatic travel.

Upon the outer-peripheral area SA2 and the work target area CA2 being set, a travel path in the work target area CA2 is calculated, as shown in FIG. 9 The calculated travel path is sequentially set as a target travel path, based on a work travel pattern. The combine harvester is subjected to automatic travel control so as to travel along the set target travel path.

Configuration of Combine Harvester Control System

Figure 10:
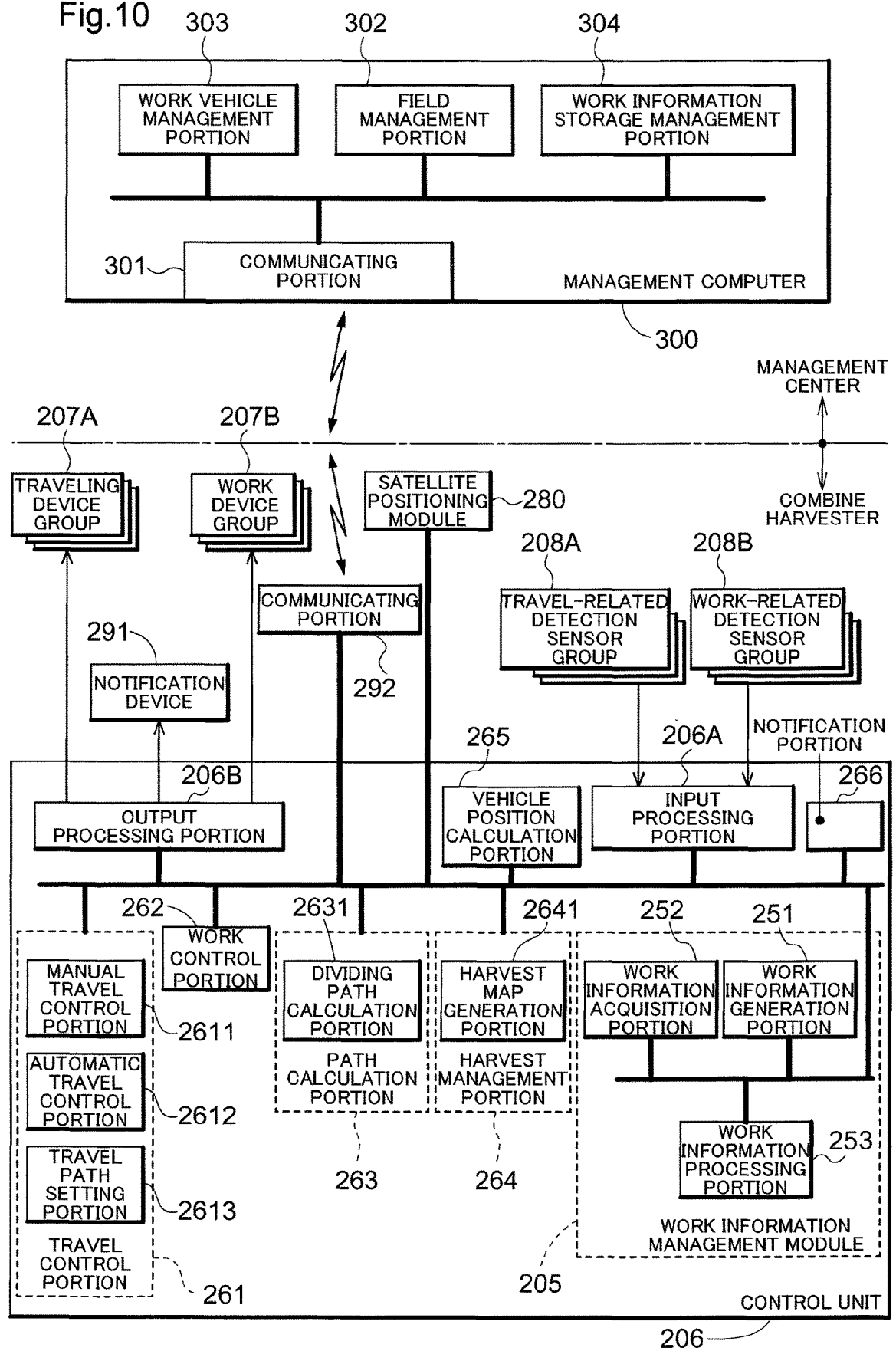
FIG. 10 is a functional block diagram showing a configuration of a control system of the combine harvester.

FIG. 10 shows a control system of the combine harvester that uses the travel path generation system according to the present invention. FIG. 10 shows functional portions provided in a management computer 300, which is installed in a management center that provides a cloud service, and functional portions provided in the control system of the combine harvester. The functional portions provided in the management computer 300 can alternatively be provided in the control system of the combine harvester, or in the communication terminal 204 that is brought into the combine harvester.

The control system of the combine harvester is constituted by a large number of electronic control units that are called ECUs, various operational devices, a sensor group and a switch group, and a wired network such as an in-vehicle LAN for data transmission therebetween. A notification device 291 is a device for notifying the operator or the like of a work travel state and various warnings, and may include a buzzer, a lamp, a speaker, a display, or the like. The communicating portion 292 is used for the control system of the combine harvester to exchange data with the management computer 300 installed at a remote place and other communication terminals 204. The communication terminals 204 include a tablet computer that is operated by an observer who is standing in the field, or an observer (including the operator) who is sitting in the combine harvester. The control unit 206 is a core element of this control system, and is illustrated as an aggregate of a plurality of ECUs. The positioning data from the satellite positioning module 280 is input to the control unit 206 through the in-vehicle LAN.

The control unit 206 includes an output processing portion 206B and an input processing portion 206A as input and output interfaces. The output processing portion 206B is connected to a traveling device group 207A and a work device group 207B.

The traveling device group 207A includes operational devices related to vehicle travel, e.g. an engine control device, a gear shift control device, a brake control device, a steering control device, and the like. The work device group 207B includes operational devices in the harvesting portion H2, the threshing apparatus 213, the conveyance apparatus 216, the grain discharge apparatus 218, and the like.

A travel-related detection sensor group 208A, a work-related detection sensor group 208B, and the like, are connected to the input processing portion 206A. The travel-related detection sensor group 208A includes sensors for detecting the state of an engine speed adjustment tool, an acceleration pedal, a brake pedal, a gear shift operational tool, and the like. The work-related detection sensor group 208B includes sensors for detecting the apparatus state of the harvesting portion H2, the threshing apparatus 213, the conveyance apparatus 216, and the grain discharge apparatus 218, as well as the state of grain culms and grains The control unit 206 includes a work information management module 205, a travel control portion 261, a work control portion 262, a path calculation portion 263, a harvest management portion 264, a vehicle position calculation portion 265, and a notification portion 266.

The notification portion 266 generates notification data based on a command or the like from the functional portions of the control unit 206, and gives the generated notification data to the notification device 291. The vehicle position calculation portion 265 calculates a vehicle position, which is the map coordinates (or field coordinates) of a portion of the machine body 210 that is set in advance, based on the positioning data that is sequentially sent from the satellite positioning module 280. The satellite positioning module 280 and the vehicle position detection module 265 constitute a vehicle position detection module for detecting the vehicle position. The travel control portion 261 has an engine control function, a steering control function, a vehicle speed control function, and the like, and gives a travel control signal to the traveling device group 207A. The work control portion 262 gives a work control signal to the work device group 207B in order to control operations of the harvesting portion H2, the threshing apparatus 213, the grain discharge apparatus 218, the conveyance apparatus 216, and the like.

The combine harvester according to this embodiment can travel both automatically (automatic steering) and manually (manual steering). For this reason, the travel control portion 261 includes a manual travel control portion 2611, an automatic travel control portion 2612, and a travel path setting portion 2613. Also, a travel mode switch (not shown) for selecting either an automatic travel mode of traveling with automatic steering to perform automatic travel work and a manual travel mode of traveling with manual steering to perform manual travel work is provided in the operation section 212. It is possible to switch from manual travel to automatic travel or from automatic travel to manual travel by operating the travel mode switch.

If the manual travel mode is selected, the manual travel control portion 2611 generates a control signal based on an operation performed by the operator, and thus controls the traveling device group 207A.

The travel path setting portion 2613 sets the travel path created by the path calculation portion 263 as a target travel path during automatic travel. Note that this travel path may also be used during manual travel as guidance for the combine harvester to travel along this travel path.

If the automatic travel mode is selected, the automatic travel control portion 2612 generates a control signal for automatic steering and a vehicle speed change, and controls the traveling device group 207A. A control signal related to automatic steering is generated so as to resolve an orientation shift and a position shift between the target travel path that is set by the travel path setting portion 2613 and the vehicle position calculated by the vehicle position calculation portion 265. A control signal related to a vehicle speed change is generated based on a vehicle speed value that is set in advance.

If the manual travel mode is selected, the work control portion 262 generates a control signal to control the work device group 207B, based on an operation performed by the operator. If the automatic travel mode is selected, the work control portion 262 also generates a control signal in accordance with a preset travel position or travel state, and controls the work device group 207B. Needless to say, even in the automatic travel mode, the work control portion 262 can also control the work device group 207B, at least partially based on an operation performed by the operator.

The combine harvester according to this embodiment includes the harvest management portion 264 as a yield measurement function of measuring the yield (harvest amount) per unit of travel, and a functional portion for measuring the taste (here, moisture and protein) of grains harvested per unit of travel. The harvest management portion 264 is provided with a harvest map generation portion 2641, and the harvest map generation portion 2641 generates a harvest map while associating the yield per unit of travel and the taste with the travel trajectory (vehicle position) of the machine body 210.

The work information management module 205 includes a work information generation portion 251, a work information acquisition portion 252, and a work information processing portion 253. The work information generation portion 251 generates work information, which is information regarding work that has actually been performed in the field (harvest work in the case of a combine harvester; cultivating work in the case of a tractor; seeding work or seedling planting work in the case of a seeding machine or a rice transplanter, etc.). The work information generated by the work information generation portion 251 of the combine harvester includes, as harvest information, a travel trajectory in the field, the yield (yield map) per unit parcel, the taste (quality map), and the like. The generated work information is linked with a field ID for specifying the field, a manager ID for specifying a manager who has engaged in the work, a field work vehicle ID for specifying the combine harvester that has performed the work, and the like, and is uploaded to the management computer 300, by the work information processing portion 253.

Furthermore, if the field work vehicle is a seeding machine or a rice transplanter, work information includes, as planting information, a seedling row formation map that indicates, for example, a travel trajectory in the field, a seedling row direction of seedlings that is obtained based on the travel trajectory, a fertilizer application map, and the like. If the field work vehicle is a tractor equipped with a cultivating apparatus, work information includes, as cultivation information, a travel trajectory in the field, a ridge formation map that includes a ridge extending direction that is obtained based on the travel trajectory, and the like.

The work information acquisition portion 252 downloads, from the management computer 300, work information regarding a preceding field work vehicle that has performed work previously in the field in which field work is to be performed hereafter.

The management computer 300 includes a communicating portion 301 that exchanges data with the communicating portion 292 of each field work vehicle, a field management portion 302, a work vehicle management portion 303, and a work information storage management portion 304. The field management portion 302 manages field information regarding each field in which work is performed by different types of field work vehicles. Field information includes a field owner, a field map, soil characteristics, planting history, and the like. The work vehicle management portion 303 manages work vehicle information, which includes an owner of a work vehicle, a type name, work vehicle specifications, travel distance, travel time, and the like.

The work information storage management portion 304 stores and manages work information that is generated and uploaded by the work information generation portions 251 of not only the combine harvester but also other field work vehicles, in the form in which the work information is linked with corresponding field information and corresponding work vehicle information. For example, the work information storage management portion 304 can store and manage work information in a work information layer structure for each field and each field work vehicle, as shown in FIG. 6. Thus, the work information storage management portion 304 can send, to a field work vehicle that is to work hereafter, work information regarding a field work vehicle that has performed work previously in the same field.

For example, when the combine harvester performs harvest work in a specific field, the work information acquisition portion 252 downloads, from the management computer 300, planted seedling row information that includes a seedling row formation map included in the work information generated by a rice transplanter that has previously performed seedling planting work in the field. Next, the work information processing portion 253 obtains a direction in which seedling rows extend, based on the acquired seedling row formation map, and gives the obtained direction in which seedling rows extend to the path calculation portion 263. The path calculation portion 263 calculates a travel path such that a path extending along the direction in which seedling rows extend is as long as possible.

The path calculation portion 263 in this embodiment includes a dividing path calculation portion 2631 for calculating a dividing path. When harvest work using a dividing path is first performed in a field, the dividing path calculation portion 2631 calculates a dividing path such that travel paths in divided fields divided by the dividing path can be readily extended in the direction in which seedling rows extend.

Figure 11:
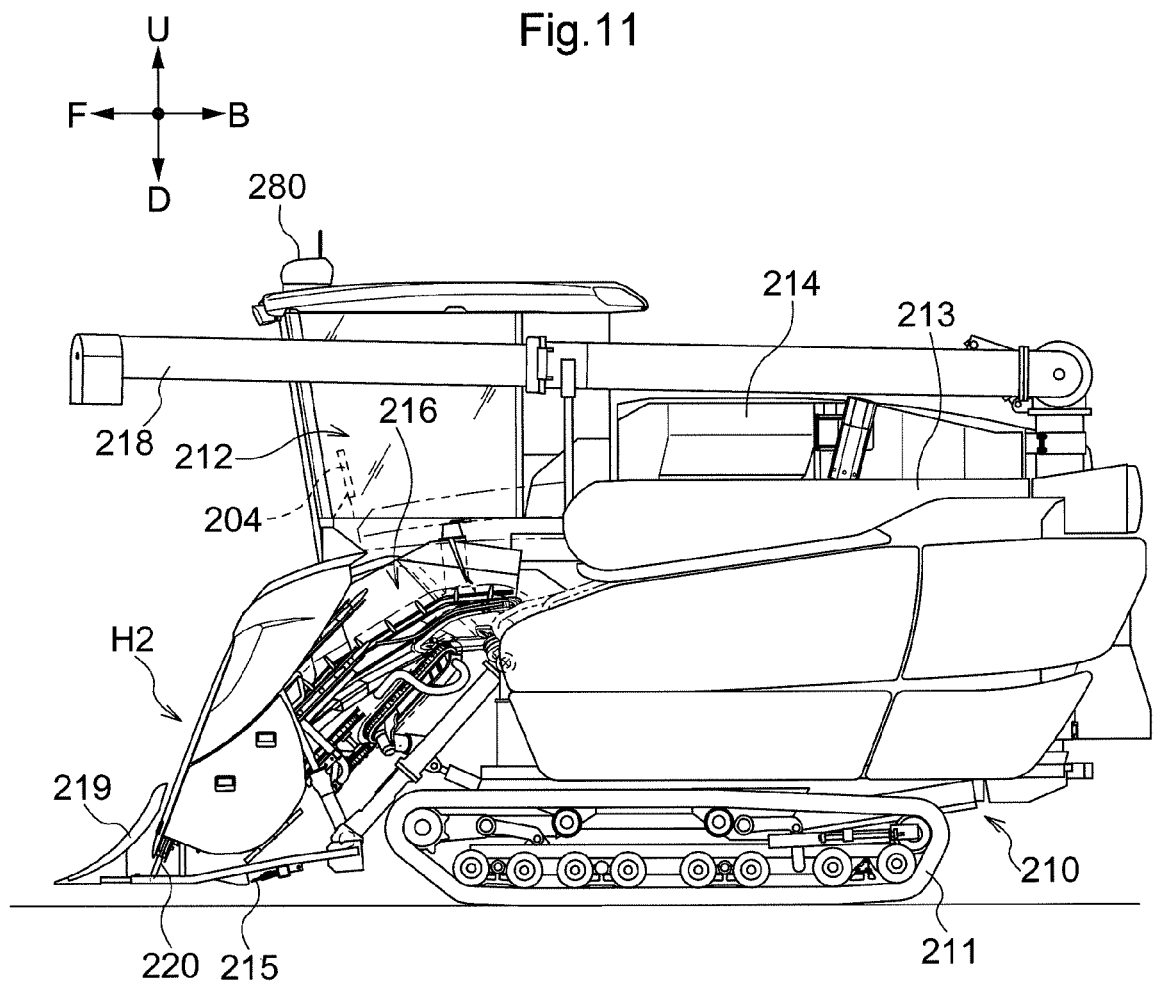
FIG. 11 is a side view of a self-threshing combine harvester, which is an example of a harvester.
Figure 12:
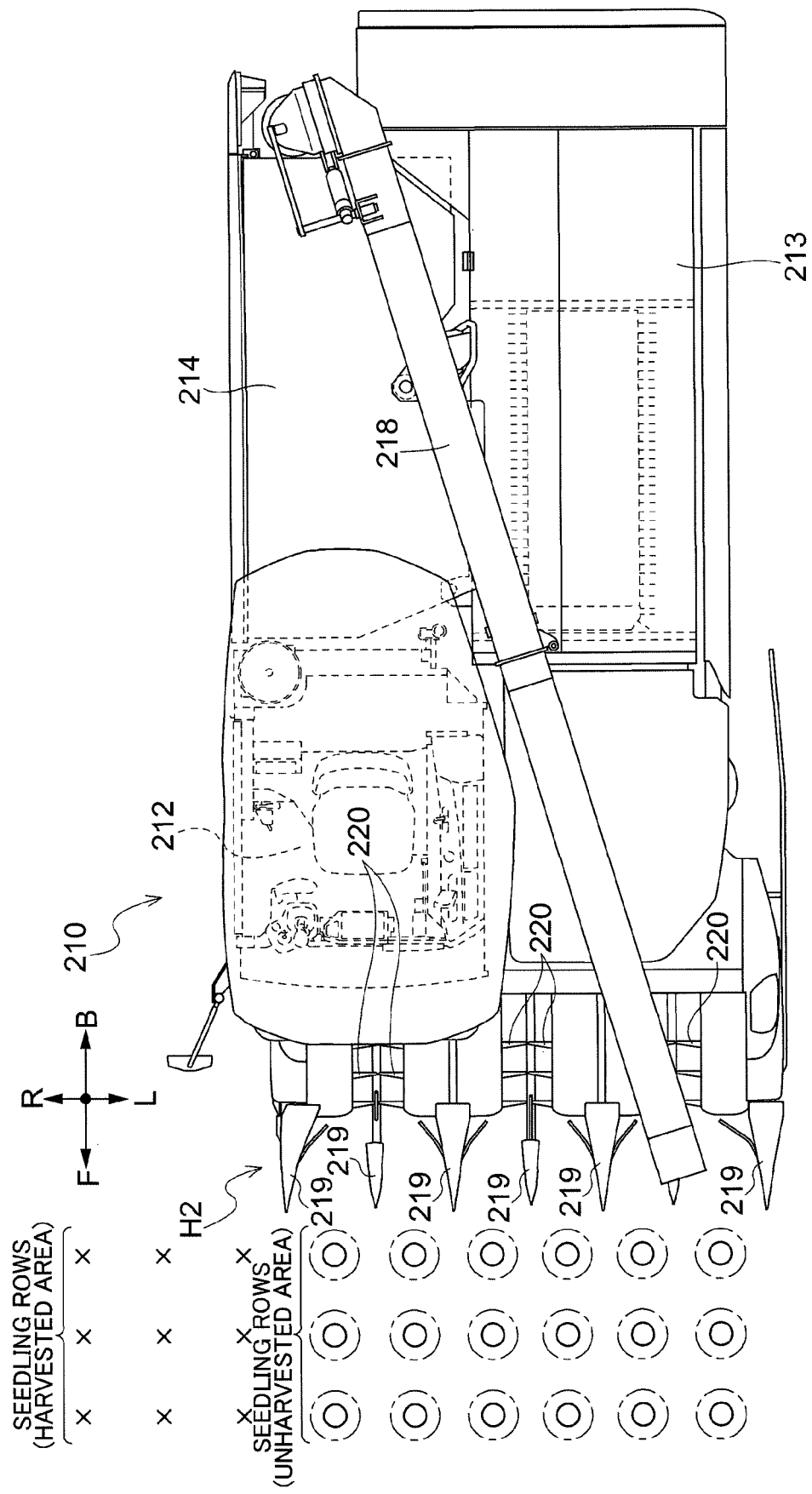
FIG. 12 is a plan view of the self-threshing combine harvester.

Variations of Second Embodiment (1) In the above-described embodiment, a normal combine harvester has been taken as an example of a harvester. FIGS. 11 and 12 show a self-threshing combine harvester as a different type of harvester. A normal combine harvester and a self-threshing combine harvester have similar configurations, as is clear from comparison between FIGS. 7 and 11. However, the self-threshing combine harvester is provided with a plurality of dividers 219 and a pull-out apparatus 220, in place of the reel 217, in a front-end area of the harvesting portion H2. As shown in FIG. 12, the dividers 219, which are arranged at intervals of lows in the lateral direction, have a function of proceeding between the seedling rows and sorting planted grain culms by seedling row. The planted grain culms sorted by the dividers 219 are pulled out by the pull-out apparatus 220. The pulled-out planted grain culms are cut by the cutting mechanism 215. To cause the dividers 219 to accurately proceed between the seedling rows in the middle of work, a target travel path needs to be set such that the positional relationship between a seedling row serving as a boundary between an unharvested area and a harvested area and the dividers 219 is appropriate. For this purpose, the path calculation portion 263 has a function of correcting a travel path that is calculated in advance, so as to optimize the position of the seedling row on the unharvested area side that is calculated based on the planted seedling row information and the position of a divider 219 on an end side in the machine-body left-right direction. Examples of an optimum position of the divider 219 may be a position at which the divider 219 on an end side in the left-right direction proceeds at a boundary between the unharvested area and the harvested area, onto a boundary seedling row in the harvested area that is closest to the unharvested area, or between a boundary seedling row in the harvested area and a boundary seedling row in the unharvested area. Also, in order that the divider 219 comes at the aforementioned optimum position, the divider 219 may be configured such that the position of a leading end portion of the divider 219 can be changed in the machine-body left-right direction, and the divider 219 may be controlled such that the leading end of the divider 219 is located at a preferable position.

(2) In the above embodiment, the field management portion 302, the work vehicle management portion 303, and the work information storage management portion 304 are provided in the management portion 300. Alternatively, a configuration may be employed in which the field management portion 302, the work vehicle management portion 303, and the work information storage management portion 304 are built in a portable communication terminal 204 that can be carried, brought into a field work vehicle that is to about to perform work, and exchange data with the work information management module 205. Furthermore, a configuration may be employed in which only required work information is recorded in advance in a storage medium such as a USB memory, and is transferred to the work information management module 205.

(3) In the above embodiment, the work information management module 205 is provided in the control system of the field work vehicle. However, a configuration may alternatively be employed in which the work information management module 205 is also provided in the management computer 300, the communication terminal 204, or the like, creates work information based on data related to work that is sent from a field work vehicle, and sends necessary work information to the path calculation portion 263. Furthermore, a configuration may be employed in which the path calculation portion 263 is also provided in the management computer 300, the communication terminal 204, or the like, and a field work vehicle receives a calculated travel path therefrom.

(4) The functional portions shown in FIG. 10 are divided mainly for the purpose of description. In practice, each of the functional portions may be integrated with other functional portions, or may be divided into a plurality of functional portions.

(5) The harvester serving as a field work vehicle to which the present invention is applied may be not only self-threshing combine harvesters or normal combine harvesters for harvesting rice, wheat, or the like, but also combine harvesters for harvesting other farm produce such as corn, and harvesters for harvesting carrot or the like.

(6) The present invention is applicable to systems for generating a travel path for performing automatic travel in a field in which work is performed by different types of field work vehicles, and field work vehicles that use such a system.

Note that the configurations disclosed in the above embodiments (including variations; the same applies to the following) can be applied in combination with configurations disclosed in other embodiments, as long as there is no inconsistency. Also, the embodiments disclosed in the present specification are examples. The embodiments of the present invention are not limited thereto, and may be altered, as appropriate, without departing from the object of the present invention.

DESCRIPTION OF REFERENCE SIGNS

10: Vehicle body (traveling vehicle)
11: Traveling apparatus
110: Tilting mechanism
4: Slip determination module
41: Slip amount calculation portion
42: Appropriateness determination portion
43: Automatic travel stop portion
5: Control unit
50: Vehicle position calculation portion
51: Travel control portion
511: Manual travel control portion
512: Automatic travel control portion
513: Travel path setting portion
52: Work control portion
53: Travel mode management portion
54: Path calculation portion
55: Turning performance adjustment portion
56: Notification portion
57: Input processing portion
58: Output processing portion
631: Axle number-of-revolutions sensor
80: Vehicle position detection module
81: Satellite navigation module
82: Inertial navigation module
210: Machine body
219: Divider
204: Communication terminal
205: Work information management module
251: Work information generation portion
252: Work information acquisition portion
253: Work information processing portion
206: Control unit
206A: Input processing portion
206B: Output processing portion
261: Travel control portion
2611: Manual travel control portion
2612: Automatic travel control portion
2613: Travel path setting portion
262: Work control portion
263: Path calculation portion
2631: Dividing path calculation portion
264: Harvest management portion
265: Vehicle position calculation portion
266: Notification portion
280: Satellite positioning module
291: Notification device
292: Communicating portion
300: Management computer 301: Communicating portion
302: Field management portion
303: Work vehicle management portion
304: Work information storage management portion
CA2: Work target area
H2: Harvesting portion
SA2: Outer-peripheral area

The invention claimed is:

1. A slip determination system comprising:
a traveling vehicle body;
a vehicle position detection module for detecting a vehicle position;
an automatic travel control portion for enabling automatic travel based on the vehicle position and a set travel path;
a slip amount calculation portion for calculating a slip amount of the traveling vehicle body, using an estimated movement distance of the traveling vehicle body calculated based on the number of revolutions of a driving axle of the traveling vehicle body, and an actual movement distance of the traveling vehicle body calculated based on the vehicle position;
an appropriateness determination portion for performing appropriateness determination to determine, based on the slip amount, whether or not a state of a traveling ground surface is appropriate for automatic travel; and
an automatic travel stop portion for stopping automatic travel enabled by the automatic travel control portion, based on a determination result from the appropriateness determination portion,
wherein the appropriateness determination portion performs the appropriateness determination based on successive behavior of the slip amount, the successive behavior being based on a statistical calculation result of average calculation or intermediate value calculation, in a predetermined period, of successively calculating a plurality of the slip amount.

2. The slip determination system according to claim 1, further comprising
a turning performance adjustment portion for adjusting turning performance of the traveling vehicle body,
wherein the turning performance adjustment portion adjusts the turning performance if the slip amount exceeds a predetermined value.

3. The slip determination system according to claim 2,
wherein, as the adjustment of the turning performance, a speed of the traveling vehicle body is increased when straight travel is switched to turning travel.

4. The slip determination system according to claim 2, further comprising
a tilting mechanism for tilting the traveling vehicle body, wherein, as the adjustment of the turning performance, the traveling vehicle body is tilted such that a turning outer side thereof is raised during a turn.

5. A travel path generation system that generates a travel path for performing automatic travel in a field in which work is performed by different types of field work vehicles, the system comprising:
a work information storage management portion for storing and managing work information in a form in which the work information is linked with corresponding field information and corresponding work vehicle information, the work information being uploaded after being generated by a preceding field work vehicle previously performing work in the field, the preceding field work vehicle being in a form of a seeding machine or a rice transplanter as a seedling row forming machine for forming seedling rows;
a work information acquisition portion for acquiring, from the work information storage management portion, a seedling row formation map included in the work information regarding the preceding field work vehicle; and
a path calculation portion for calculating, based on the seedling row formation map, a subsequent field work vehicle travel path for a subsequent field work vehicle that is to perform automatic travel work hereafter in the field in which work has been performed by the preceding field work vehicle,
wherein the path calculation portion calculates the subsequent field work vehicle travel path with use of positions of the seedling rows and a direction in which the seedling rows extend, the positions and the direction being obtained based on the seedling row formation map, the subsequent field work vehicle travel path being calculated such that the subsequent field work vehicle travel path includes a first path and a second path, the first path extending in the direction in which the seedling rows extend, the second path extending in a direction crossing the direction in which the seedling rows extend, the first path being longer than the second path.

6. The travel path generation system according to claim 5,
wherein the path calculation portion includes a dividing path calculation portion for calculating a dividing path that divides the field, as one subsequent field work vehicle travel path, and
the dividing path calculation portion calculates the dividing path based on the seedling row formation map, such that the travel path in divided fields that are divided by the dividing path can be readily extended in the direction in which the seedling rows extend.

7. The travel path generation system according to claim 5,
wherein a harvesting portion of the subsequent field work vehicle is provided with dividers that are arranged laterally, and
the travel path is corrected so as to optimize a positional relationship between (i) positions of the seedling rows on an unworked area side that are calculated based on the seedling row formation map, and (ii) a position of one of the dividers, on an end side in a machine-body left-right direction.

8. A field work vehicle comprising:
the travel path generation system according to claim 6;
a vehicle position detection module for detecting a vehicle position; and
an automatic travel control portion for enabling automatic travel based on the travel path calculated by the path calculation portion and the vehicle position.

9. A slip determination system comprising:
a traveling vehicle body;
a vehicle position detection module for detecting a vehicle position;
an automatic travel control portion for enabling automatic travel based on the vehicle position and a set travel path;
a slip amount calculation portion for calculating a slip amount of the traveling vehicle body, using an estimated movement distance of the traveling vehicle body calculated based on the number of revolutions of a driving axle of the traveling vehicle body, and an actual movement distance of the traveling vehicle body calculated based on the vehicle position;

an appropriateness determination portion for performing appropriateness determination to determine, based on the slip amount, whether or not a state of a traveling ground surface is appropriate for automatic travel and for determining, if the slip amount exceeds an allowable slip amount, that the state of the traveling ground surface is not appropriate for automatic travel;

an automatic travel stop portion for stopping automatic travel enabled by the automatic travel control portion, based on a determination result from the appropriateness determination portion; and a turning performance adjustment portion for adjusting turning performance of the traveling vehicle body, wherein if the slip amount exceeds a predetermined value, the turning performance adjustment portion adjusts the turning performance without the automatic travel stop portion stopping automatic travel.

* * * * *